(12) United States Patent
Beukema et al.

(10) Patent No.: US 7,733,980 B2
(45) Date of Patent: Jun. 8, 2010

(54) QUADRATURE MODULATION CIRCUITS AND SYSTEMS SUPPORTING MULTIPLE MODULATION MODES AT GIGABIT DATA RATES

(75) Inventors: Troy James Beukema, Briarcliff Manor, NY (US); Alberto Valdes Garcia, White Plains, NY (US); Scott Kevin Reynolds, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 11/486,539

(22) Filed: Jul. 14, 2006

(65) Prior Publication Data

US 2010/0102895 A1 Apr. 29, 2010

(51) Int. Cl.
 *H03C 1/52* (2006.01)
(52) U.S. Cl. .................. 375/300; 375/261; 375/298; 375/302; 375/305; 375/308; 332/146; 332/120; 327/29; 327/232; 327/307; 327/437
(58) Field of Classification Search .............. 375/303, 375/298, 369, 271–274, 261, 268, 279, 280, 375/283, 302, 305, 308, 30; 327/104, 120, 327/144, 29, 30, 79, 86, 85, 107, 232, 239, 327/253, 255, 256, 307, 437; 332/102, 105, 332/120, 144–146, 149
See application file for complete search history.

(56) References Cited

U.S. PATENT DOCUMENTS

| | | | |
|---|---|---|---|
| 3,926,536 A * | 12/1975 | Ciastula et al. ............. 416/135 |
| 4,368,439 A | 1/1983 | Shibuya et al. |
| 5,515,013 A | 5/1996 | McConnell |
| 5,564,100 A | 10/1996 | Huang et al. |
| 5,706,310 A | 1/1998 | Wang et al. |
| 5,757,245 A | 5/1998 | Song |
| 5,767,752 A | 6/1998 | Yeon et al. |
| 5,892,798 A * | 4/1999 | Finkenbeiner et al. ...... 375/305 |
| 5,929,677 A * | 7/1999 | Murata ...................... 327/157 |
| 6,345,173 B1 | 2/2002 | Fourtet et al. |
| 6,597,240 B1 * | 7/2003 | Walburger et al. ............ 330/10 |
| 6,873,218 B2 | 3/2005 | Khlat |
| 6,975,165 B2 * | 12/2005 | Lopez Villegas et al. ..... 329/304 |
| 7,016,664 B2 * | 3/2006 | Souetinov ................... 455/323 |
| 7,039,383 B2 * | 5/2006 | Kimura ...................... 455/333 |
| 2004/0001560 A1 * | 1/2004 | Darabi ....................... 375/303 |
| 2004/0037366 A1 * | 2/2004 | Crawford .................... 375/295 |
| 2004/0174928 A1 * | 9/2004 | Siwiak et al. ............... 375/146 |
| 2004/0229589 A1 * | 11/2004 | Behzad ....................... 455/285 |
| 2005/0014476 A1 * | 1/2005 | Oono et al. .................. 455/118 |
| 2005/0105633 A1 * | 5/2005 | Lopez Villegas et al. .... 375/269 |
| 2005/0190846 A1 * | 9/2005 | Smaini et al. ............... 375/247 |
| 2005/0220218 A1 * | 10/2005 | Jensen et al. ................. 375/302 |

\* cited by examiner

*Primary Examiner*—David C Payne
*Assistant Examiner*—Rahel Guarino

(57) ABSTRACT

A quadrature modulation circuit includes a mixer circuit including an integrated sign modulation control circuit and a plurality of mixer ports. The mixer ports include a first input port, a second input port, an output port and a sign modulation control port. The modulation circuit generates a modulated signal by operation of the mixer circuit multiplying a modulating signal applied to the first input port with a carrier signal applied to the second input port to generate a mixed signal output from the output port, and by operation of the integrated sign modulation control circuit controlling polarity switching of a signal at one of the mixer ports in response to a sign modulation control signal input to the sign modulation control port.

18 Claims, 16 Drawing Sheets

US 7,733,980 B2

QUADRATURE MODULATION CIRCUITS AND SYSTEMS SUPPORTING MULTIPLE MODULATION MODES AT GIGABIT DATA RATES

GOVERNMENT LICENSE RIGHTS

This invention was made with Government support under Contract No. NBCH2030001 awarded by the Defense Advanced Research Projects Agency. The Government has certain rights in this invention.

TECHNICAL FIELD OF THE INVENTION

The present invention relates generally to circuits and methods for implementing quadrature modulation systems that support various modulation modes including ASK (amplitude shift key), FSK (frequency shift key) and PSK (phase shift key) modulation at high data rates (e.g., gigabit data rates) and, in particular, to modulation circuits and systems for implementing integrated radio transmitters having quadrature modulation systems that support multiple modes of ASK, FSK or PSK modulation at gigabit-rates for millimeter wave wireless communication applications.

BACKGROUND

The increasing market demand for wireless connectivity coupled with innovations in integrated circuit technology has resulted in increased research and development of low cost, low power, and compact monolithic integration of radio transmitters, receivers, and transceivers capable of operating at GHz carrier frequencies. For example, advances in high-speed silicon-germanium technology, together with the availability for unlicensed use of 3 GHz-7 GHz of bandwidth in the 60 GHz ISM (industrial-scientific-medical) band, have served as a catalyst for potential widespread implementation of low cost 60 GHz wireless data transmission systems using integrated 60 GHz radio transceivers.

Indeed, the large unlicensed bandwidth available in the 60 GHz ISM band enables wireless systems to be implemented using digital modulation techniques such as QAM (quadrature amplitude modulation), ASK (amplitude-shift key), FSK (frequency-shift key) or PSK (phase-shift key) modulations to achieve gigabit-rate modulations that support high bandwidth applications such as wireless Gigabit Ethernet and HDTV (high definition television) streaming. In comparison to conventional analog modulation techniques, digital modulation schemes such as QAM, ASK, FSK and PSK are more power efficient and are more robust to noise and multipath effects, etc. Moreover, digital modulation provides more information capacity, higher data security, and better quality communication, especially for low power, high data rate applications.

The quadrature modulator is a fundamental component that is commonly used for digital microwave radio communications systems. FIG. 1 is a block diagram illustrating a quadrature modulator (10) having a conventional framework. The quadrature modulator (10) comprises a first mixer (11), a second mixer (12), a phase shifter (13) and summing circuit (14). The inputs to the quadrature modulator (10) include modulating signals I (in-phase signal) and Q (quadrature-phase signal), and an LO (local oscillator) signal. The I and Q modulating signals may be analog signals I(t) and Q(t) generated by a baseband processor which implements complex DSP processing functions for purposes of processing and encoding a data signal (digital data) to generate independent I and Q serialized digital data streams to represent the input data. The baseband processor can implement DAC (digital to analog converters) to covert the I and Q digital streams to analog signals I(t) and Q(t), which are input to respective IQ mixers (11) and (12).

The LO port of the first mixer (11) receives the LO signal as an in-phase LO signal, $LO_1(0°)$, while the phase shifter (13) phase shifts the LO signal by 90° to produce a quadrature-phase LO signal, $LO_Q$ (90°), which is input to the LO port of the second mixer (12). The first mixer (11) mixes the I-channel input signal, I(t), with the in-phase LO signal, $LO_1$, and the second mixer (12) mixes the Q-channel input signal, Q(t), with the quadrature-phase LO signal, $LO_Q$. The outputs of the mixers (11) and (12) are combined by the summing circuit (14) to generate a QAM modulated output:

$$V_{out}(t)=[I(t)*\cos(2\pi f_{LO}t)]-[Q(t)*\sin(2\pi f_{LO}t)] \quad (1)$$

where $I(t)=A(t)\cos \phi(t)$ and $Q(t)=A(t)\sin \phi(t)$.

The QAM output signal of the modulator (10) can also be represented as:

$$V_{out}(t)=A(t)\cos [(w_{LO}t)-\phi(t)] \quad (2),$$

where the signal amplitude is $$A(t)=\sqrt{I^2(t)+Q^2(t)} \quad (3)$$

and where the phase modulation (shift) is $$\phi(t)=\tan^{-1}[Q(t)/I(t)] \quad (4)$$

In this regard, a conventional quadrature modulator such as depicted in FIG. 1 can support a modulation scheme in which one or more parameters of the carrier (LO) frequency (amplitude, phase and/or frequency) can be modulated to represent information. The quadrature modulator (10) of FIG. 1 can readily support various QAM modulation modes and PSK modulation modes, such as BPSK (binary phase-shift key) (which is essentially 2-QAM) and QPSK (quadrature phase-shift key) modulation (which is essentially 4-QAM). In theory, any modulation format can be implemented using quadrature (IQ) modulation techniques, including ASK and FSK, by converting an input stream of data bits to appropriate waveform values on the baseband I and Q inputs to realize the desired modulation, as is understood by those of ordinary skill in the art. When using quadrature modulation schemes, however, it is a non-trivial, challenging and resource-consuming task to create the required baseband waveforms for a desired modulation (e.g., FSK) at the very high speeds that are required to achieve gigabit rate modulation.

SUMMARY OF THE INVENTION

Exemplary embodiments of the invention generally include circuits and methods for implementing modulation systems that support various modulation modes including ASK, FSK, and PSK modulation at high data rates (e.g., gigabit data rates). More specifically, exemplary embodiments of the invention include circuits and methods for implementing integrated radio transmitters having quadrature modulation systems that support multiple modes of ASK, FSK or PSK or simultaneous ASK/FSK or ASK/PSK modulation modes at gigabit-rates for millimeter wave wireless communication applications.

In one exemplary embodiment of the invention, a modulation circuit comprises a mixer circuit including an integrated sign modulation control circuit and a plurality of mixer ports. The mixer ports include a first input port, a second input port, an output port and a sign modulation control port. The modulation circuit generates a modulated signal by operation of the mixer circuit multiplying a modulating signal applied to the first input port with a carrier signal applied to the second input port to generate a mixed signal output from the output port, and by operation of the integrated sign modulation control circuit controlling polarity switching of a signal at one of the mixer ports in response to a sign modulation control signal input to the sign modulation control port. The sign modulation control signal can be a digital data signal having binary data encoded into the modulated signal.

In one exemplary embodiment of the invention, the modulation circuit is a quadrature modulation circuit that supports FSK (frequency-shift key) and PSK (phase-shift key) modulation modes. In another embodiment, the mixer further includes an integrated amplitude modulation control circuit to control amplitude modulation in response to an amplitude modulation control signal input to an amplitude modulation control port of the mixer circuit. The sign modulation control signal and amplitude modulation control signals can be digital data signals having binary data encoded into the modulated signal. With amplitude modulation control, the quadrature modulation circuit supports FSK, PSK and ASK (amplitude-shift key) modulation modes as well as simultaneous ASK/FSK and ASK/PSK modulation modes. In another exemplary embodiment, the mixer circuit further includes a slew rate control port to input a slew rate control signal to controllably adjust a rate of the polarity switching of a signal by the integrated sign modulation control circuit to realize a soft interpolation switch which minimizes spectral splatter arising from the phase polarity inversion.

In yet another exemplary embodiment of the invention, the modulation circuit is a single-channel modulation circuit that supports PSK (phase-shift key) modulation.

In another exemplary embodiment of the invention, a quadrature modulation circuit includes a mixer circuit comprising an in-phase (I) mixer and a quadrature-phase (Q) mixer; and a summing circuit coupled to an output of the mixer circuit. The I mixer comprises a plurality of I mixer ports including a baseband input port, an output port, an LO (local oscillator) port and an I sign control port; and an integrated I sign modulation control circuit to control polarity switching of a signal at one of the I mixer ports in response to an I sign modulation control signal input to the I sign control port. The Q mixer comprises a plurality of Q mixer ports including a baseband input port, an output port, an LO (local oscillator) port and a Q sign control port and an integrated Q sign modulation control circuit to control polarity switching of a signal at one of the Q mixer ports in response to a Q sign modulation control signal input to the Q sign control port. The summing circuit generates a modulated signal by adding signals output from the I and Q mixers.

In one embodiment, the quadrature modulation circuit supports a plurality of modulation modes including FSK (frequency-shift key) modulation and PSK (phase-shift key) modulation. For example, the quadrature modulation circuit performs PSK modulation by phase modulating an LO signal using a digital data signal applied to at least one of the I or Q sign modulation control ports to control polarity switching, to thereby generate a PSK modulated signal that represents binary data of the digital data signal. Moreover, the quadrature modulation circuit performs FSK modulation by frequency modulating a complex baseband signal using a digital data signal applied to at least one of the I or Q sign modulation control ports to control polarity switching, to thereby generate a FSK modulated signal that represents binary data of the digital data signal. With FSK modulation, the digital data signal can be synchronized with a fixed-frequency sinusoidal signal applied to a baseband input port of the I or Q mixer such that polarity switching is performed synchronously at zero crossings of the fixed-frequency sinusoidal signal to realize a phase-continuous frequency switch.

In yet another embodiment, the I mixer comprises an integrated I-channel amplitude modulation control circuit to modulate an amplitude of an I-channel signal in response to an I gain control signal applied to an I gain control port of the I mixer, and the Q mixer comprises an integrated Q-channel amplitude modulation control circuit to modulate an amplitude of a Q-channel signal in response to a Q gain control signal applied to a Q gain control port of the Q mixer. With amplitude and sign modulation control, the quadrature modulation circuit supports FSK (frequency-shift key), PSK (phase-shift key) and ASK (amplitude-shift key) modulation modes and simultaneous ASK/FSK and ASK/PSK modulation modes.

In another exemplary embodiment of the invention, the mixer circuit is a double balanced active mixer, wherein the I and Q mixers each comprise a mixing stage and transconductor stage. The integrated I and Q amplitude modulation control circuits and sign modulation control circuits are formed as part of the transconductor stages of the I and Q mixers, to control sign and amplitude modulation of signal applied to baseband input ports of the I and Q mixers.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary embodiments of quadrature modulation systems that support various modulation modes including FSK, PSK and ASK modulation at gigabit data rates will now be discussed in further detail. For illustrative purposes, exemplary quadrature modulation systems will be described with reference to their implementation in integrated radio transmitters to support multiple FSK, PSK and ASK modulation modes at gigabit data rates for wireless communication applications.

Figure 1:
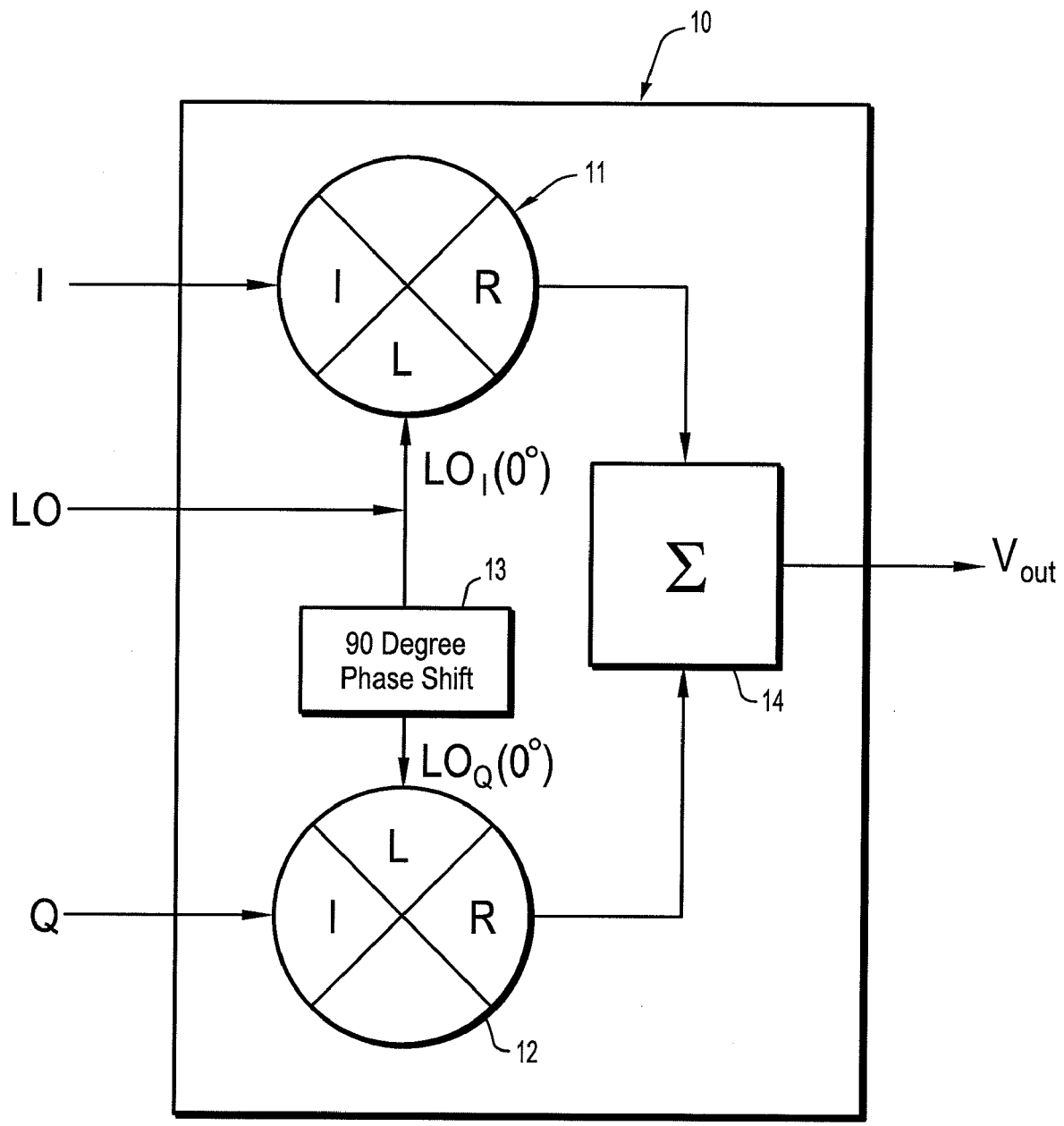
FIG. 1 is a block diagram illustrating a conventional architecture of a quadrature modulator.
Figure 2:
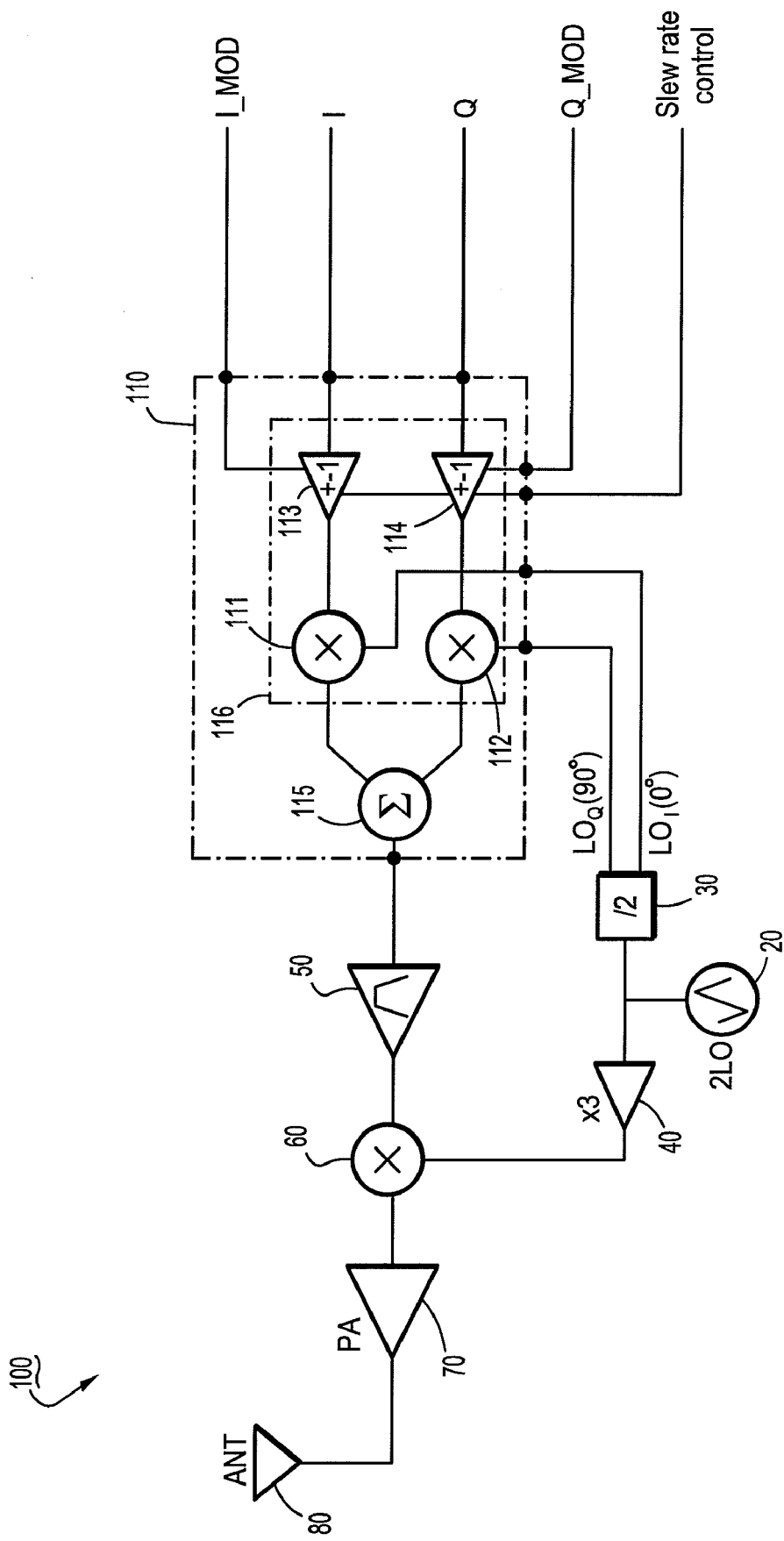
FIG. 2 is a schematic block diagram of an integrated radio transmitter which implements a quadrature modulation system that can support multiple PSK and FSK modulation modes, according to an exemplary embodiment of the invention.

For example, FIG. 2 is a schematic block diagram of a radio communications system which implements a quadrature modulation system according to an exemplary embodiment of the invention. In particular, FIG. 2 schematically illustrates an integrated radio transmitter (100) having a quadrature modulator (110) that supports various modes of modulation such as QAM, FSK and PSK at gigabit data rates, according to an exemplary embodiment of the invention. The quadrature modulator (110) generally comprises a summing circuit (115) and an integrated IQ mixer/sign modulation circuit (116). The integrated IQ mixer and sign modulation circuit (116) comprises a first mixer (111) (or I-mixer), an I-channel sign modulator (113), a second mixer (112) (or Q-mixer), and Q-channel sign modulator (114). The quadrature modulator (110) further includes I and Q input ports (baseband input ports), sign control ports I_MOD and Q_MOD for inputting digital control signals (digital data streams) to control sign modulation by the sign modulators (113) and (114) in respective I and Q channels, and an optional control input for inputting a control signal to adjustably control the slew rate of polarity switching by the sign modulators (113) and (114).

In general, the sign modulators (113) and (114) provide a framework capable of rapidly changing the sign (polarity) of an I-channel and/or Q-channel signal under digital control at gigabit data rates to realize one of various broadband PSK or FSK modulations supported by the quadrature modulation system (110). Exemplary embodiments of the invention provide frameworks in which sign modulators (113) and (114) are implemented to effect sign modulation (polarity switching) of signals applied at any one of the IQ mixer ports, i.e., the baseband input ports, the output ports, or the LO input ports of the IQ mixers (111) and (112), although FIG. 2 illustrates an exemplary embodiment in which the sign modulators (113) and (114) are applied to effect polarity switching at the baseband input ports of the respective IQ mixers (111) and (112). Exemplary sign change modulation circuits and methods are provided to enable a soft interpolating switch (sign change) of I-Channel and Q-Channel signals at the inputs or outputs of the respective IQ mixer (111) and/or (112) to thereby achieve a smooth modulated waveform with low spectral splatter. For example, as discussed below, exemplary modulation circuits include integrated mixer/sign modulation topologies in which high-speed interpolating sign modulator circuits are integrated with active Gilbert-cell mixers as part of mixer cell biasing networks to achieve high speed switching of IQ input signals applied to transconductor stages of the active Gilbert cell mixers in response to gigabit data streams applied to sign control port(s) of the mixers.

In the exemplary embodiment of FIG. 2, an optional control mechanism may be implemented using "slew rate control" signals, which are applied to additional control ports to dynamically control switching speed of the sign modulators (113) and (114). In general, slew rate control could be implemented using exemplary techniques discussed herein to select between fast switching (e.g., 20 to 100 ps rise time) or slow switching (e.g., 1ns or more rise time). For example, in one exemplary embodiment of the invention as described below, the sign modulators (113) and (114) are implemented as switching circuits that are integrated with active Gilbert cell mixers to provide variable rise time sign switching in response to slew rate control signals of varying DC voltage levels. By controlling the slew rate of sign change in the I and/or Q channel mixer/modulator circuits, spectral artifacts from switching noise at lower data rates can be reduced. Indeed, when using lower rate modulations, the slew rate control can be used to achieve longer slew rate in the integrated sign control circuitry so as to reduce spectral splatter.

It is to be appreciated that FIG. 2 illustrates a general framework of a universal, multi-modulation mode quadrature modulator (110) according to an exemplary embodiment of the invention, which can be implemented in a radio transmitter for MMW (millimeter waver) wireless communications systems for upconverting in-phase (I) and quadrature (Q) inputs from baseband to an IF (intermediate frequency). In the exemplary embodiment of FIG. 2, the integrated radio transmitter (100) comprises a local oscillator (20), phase splitter (30), frequency multiplier (40), a band-pass filter/amplifier (50) (BPFA), up-conversion mixer (60), power amplifier (70), and antenna (80).

An exemplary, general mode of operation of the transmitter (100) will now be described assuming an operating frequency of 60 GHz. The input to the phase splitter (30) is an LO signal that is twice the frequency (2LO) of the desired LO frequency. In an exemplary embodiment, the LO generator (20) generates a nominal 18 GHz LO frequency which is input to the phase splitter (30) (or quadrature splitter). The phase splitter (30) generates first and second quadrature LO signals, $LO_1$ (0°) and $LO_Q$ (90°), each at a nominal IF frequency of 9 GHz with a relative phase shift of 90°. The $LO_1$ (0°) and $LO_Q$ (90°) signals are input to the I-mixer (111) and Q-mixer (112), respectively, and modulated by the respective I and Q signals. The summing circuit (115) combines the outputs of the mixers (111) and (112) and outputs a composite IF signal (modulated signal) at a frequency at 9 GHz nominal. The quadrature modulation system (110) can support one of various modulation modes such QAM, FSK, or PSK at gigabit-rates (exemplary operating modes will be explained below with reference to FIGS. 3A, 3B, 4A and 4B, for example).

The modulated (IF) signal output from the quadrature modulation circuit (100) (i.e., the IF signal output from the summing circuit (115)) is amplified and band limited by the BPFA (50) and then output to the up-conversion mixer (60), which translates the IF signal to the RF frequency (e.g., 60 GHz frequency band). The up-conversion mixer (60) is driven by an LO signal output from the frequency multiplier (40). In the exemplary embodiment, the output of the frequency multiplier (40) is an LO signal with a nominal frequency of 54 GHz (i.e., 3×18 GHz). The mixer (60) outputs a second upconverted signal which is amplified by the power amplifier (70) and then propagated by the radiating antenna (80).

It is to be understood that the integrated radio transmitter (100) may be an SOC (system on chip) with all system components fully integrated on a single chip and where the antenna (80) may be located either off-chip or on-chip. In other embodiments of the invention, different system components of the integrated radio transmitter (100) may be integrated on two or more separate chips that are packaged together as a SOP (system on package), or packaged together using other known techniques. The quadrature modulation circuit (110) can be a semiconductor integrated circuit formed separately on a given chip or integrated with some or all integrated circuits/components of the transmitter system (100), on a semiconductor chip. Preferably, a semiconductor chip having the integrated quadrature modulation circuit (110) would include various input pins (I/O package leads, bond pads) to allow input of external signals including, for example, external I and Q signals applied to the I and Q baseband inputs pins, external sign modulation control signals for controlling polarity switching, which are applied to the I_MOD and/or Q_MOD control pins, and external slew rate control signals for controlling slew rate of the polarity switching, which are applied to the slew rate control pin.

In this regard, it is to be appreciated that the quadrature modulation system (110) is formed independent of, and does not include, front-end IQ baseband processing circuits, such that the quadrature modulation system (110) can be coupled to any desired system/circuit providing digital data streams that are to be wireless transmitted via the transmitter system (100). The quadrature modulation system (110) can operate in one of various modulation modes such as QAM, FSK, or PSK to enable wireless transmission of digital data streams at gigabit data rates. The mode of operation can vary depending on the IQ signals that are applied to the I and Q baseband inputs and the control signals applied to the I_MOD and Q_MOD control inputs, with optional slew rate control for sign modulation by applying a suitable control signal to the slew rate control input.

For example, in one mode of operation, the quadrature modulator (110) can be used in a conventional manner to provide quadrature amplitude modulation (QAM) where quadrature LO signals are applied to the IQ mixers (111) and (112), where the sign control inputs I_MOD and Q_MOD are held at fixed logic levels (no polarity switching), and where suitably encoded IQ baseband signals are applied at the I and Q input ports to modulate the amplitude of the quadrature LO signals to thereby provide a desired modulation. In addition, as discussed in further detail below with reference to FIGS. 3A and 4A, for example, the quadrature modulation circuit (110) supports various FSK modulation modes (e.g., BFSK (binary frequency shift keying) and MSK (minimum shift keying) by applying quadrature analog IQ signals to the I and Q baseband inputs and applying digital data signals (e.g., gigabit rate data signals) to one or both of the control inputs I_MOD and/or Q_MOD to provide sign conjugation control at one of the inputs or outputs of the IQ mixers (111) and/or (112). In other exemplary embodiments as discussed below with reference to FIGS. 3B and 4B, for example, the quadrature modulation circuit (110) supports various PSK modulation modes (e.g., BPSK (binary phase shift keying) and QPSK (quadrature phase shift keying) by applying fixed-level DC voltages to the I and Q baseband inputs and applying digital data signals (e.g., gigabit rate data signals) to one or both of the control inputs I_MOD and/or Q_MOD to provide sign conjugation control at one of the inputs or outputs of the IQ mixers (111) and/or (112).

Figure 3A:
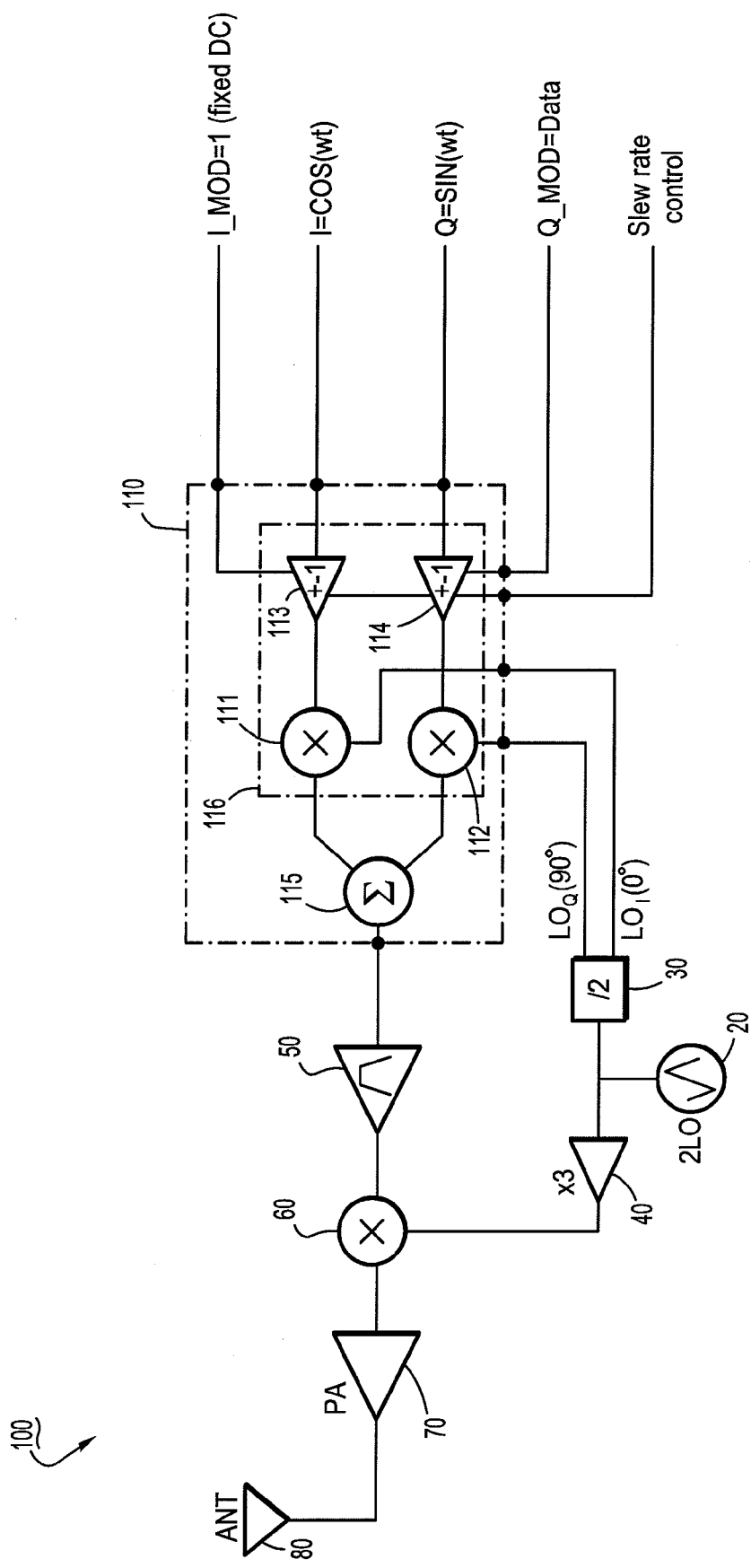
FIG. 3A is a schematic block diagram of an integrated radio transmitter having a quadrature modulation system configured for FSK modulation according to an exemplary embodiment of the invention.

FIG. 3A is a schematic block diagram illustrating an integrated radio transmitter having a quadrature modulation system configured for FSK modulation according to an exemplary embodiment of the invention. In particular, FIG. 3A illustrates the exemplary integrated radio transmitter (100) of FIG. 2 where the quadrature modulator (110) is configured for FSK modulation. With FSK modulation, a baseband frequency $f_{bb}$ is added to the LO frequency $f_{LO}$ to represent a binary 1 in a digital data control stream or subtracted from the LO frequency $f_{LO}$ to represent a binary 0. To operate in FSK modulation mode, quadrature sinusoidal signals of frequency $f_{bb}$ are applied to the IQ inputs of respective mixers (111) and (112) and quadrature local oscillator (carrier) signals with frequency $f_{LO}$ are applied to the LO inputs of the IQ mixers (111) and (112). This results in a modulated signal Vout (IF signal) at the output of the summing circuit (115) having a frequency of either $f_{LO}+f_{bb}$ or $f_{LO}-f_{bb}$, depending on the relative phase of the input signals. By applying a digital data signal to the Q_MOD input, the output IF frequency will alternate between either the upper sideband $f_{LO}+f_{bb}$ or the lower sideband $f_{LO}-f_{bb}$, according to transitions between logic levels (logic high, logic low) in the data signal input on control input Q_MOD. In this embodiment, the digital data stream to be transmitted is a sign modulation control signal directly input to the Q_MOD control port of the modulation circuit (110).

In particular, as depicted in FIG. 3A, broadband FSK modulation can be realized by inputting a fixed frequency cos(wt) signal on the I-channel and a sin(wt) signal on the Q-channel, maintaining the sign control input I_MOD for the I-channel at a fixed logic "1" level, and applying a data signal to the Q sign control input Q_MOD to control polarity switching of the sin(wt) signal on the Q-channel input. Assume the in-phase modulating signal (I) is $I(t)=v_{bb} \cos(w_{bb}t)$ and the quadrature modulating signal (Q) is $Q(t)=v_{bb} \sin(w_{bb}t)$, where $v_{bb}$ denotes a peak-to-peak modulating voltage and where $w_{bb}$ denotes the frequency of the baseband input signal. It can be shown from equations 2-4 above that:

$$A(t)=v_{bb}$$

$$\phi(t)=w_{bb}t \text{ and}$$

$$V_{out}(t)=v_{bb} \cos[(w_{LO}-w_{bb})t].$$

Thus, when the I and Q inputs are in phase quadrature, the output is that of a single-side band modulator with a frequency $f_{LO}-f_{bb}$. The output frequency can be changed to $f_{LO}+f_{bb}$ by reversing the phase shift at either the baseband Q input port, the LO port or the output port of the Q mixer (112). In FSK modulation, the amplitude of the in-phase/quadrature-phase LO signals remain unchanged. Therefore, a binary frequency-shift key (BFSK) modulation system is realized (two-level FSK modulation).

Figure 4A:
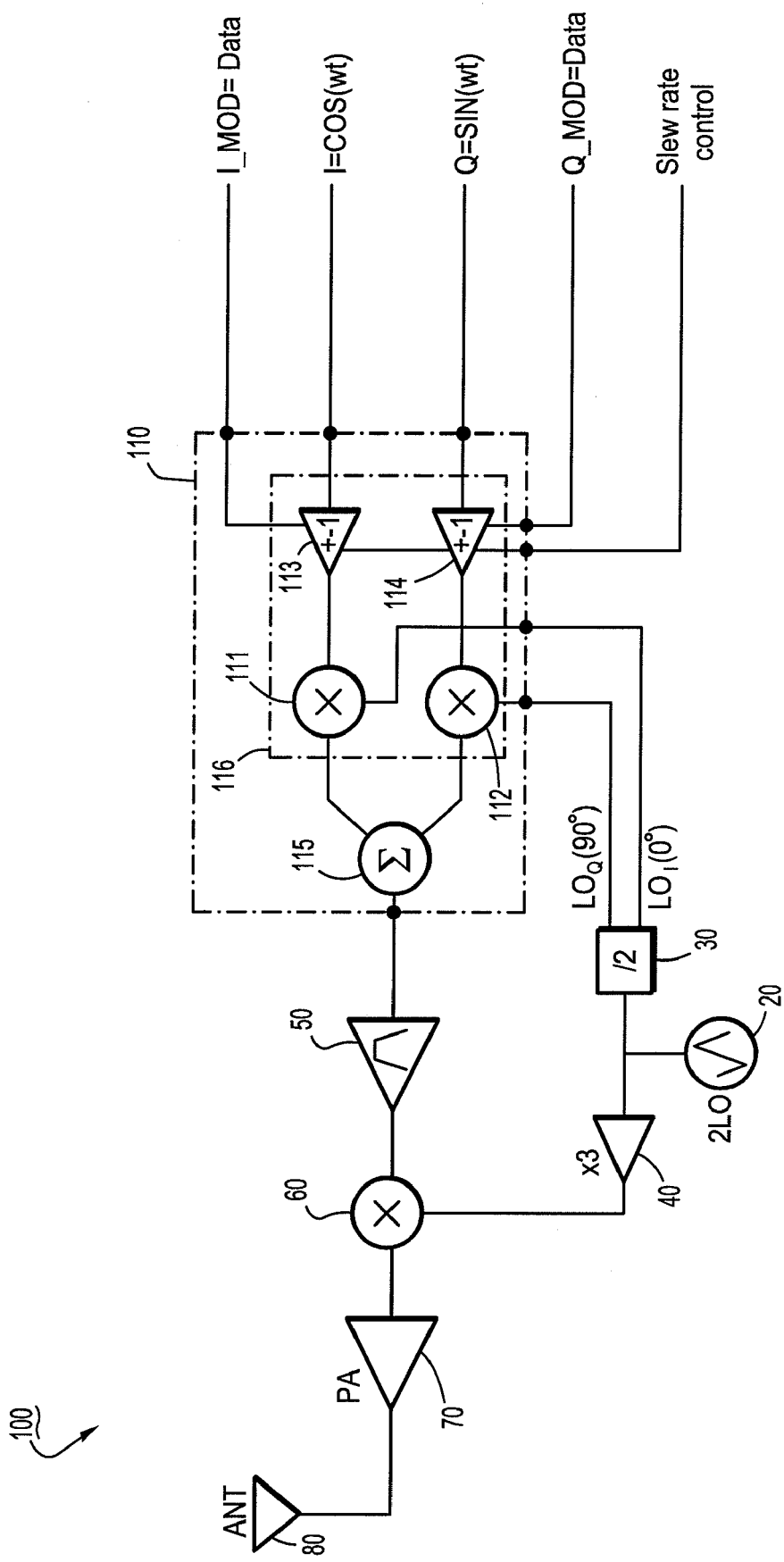
FIG. 4A is a schematic block diagram of an integrated radio transmitter having a quadrature modulation system configured for MSK modulation according to an exemplary embodiment of the invention.

In another embodiment of the invention, the quadrature modulation circuit (110) supports minimum-shift key (MSK) modulation by applying control signals to both control inputs I_MOD and Q_MOD to provide sign change in both the I and Q channel. For example, FIG. 4A illustrates the exemplary integrated radio transmitter (100) of FIG. 2 where the quadrature modulator (110) is configured for MSK modulation. In this exemplary embodiment, similar to the BFSK modulation mode of FIG. 3A, quadrature sinusoidal signals of frequency $f_{bb}$ are applied to the IQ inputs of respective mixers (111) and (112) and quadrature local oscillator (carrier) signals with frequency $f_{LO}$ are applied to the LO inputs of the IQ mixers (111) and (112). For MSK modulation, sign modulation control signals are applied to both the I_MOD and Q_MOD control ports to provide polarity switching of the I-channel input (cos(wt) signal) as a function of a first digital data signal (I-channel digital data signal) applied to the control port I_MOD and switching the polarity of the Q-channel input (sin(wt) signal) as a function of a second digital data signal (Q-channel digital data stream) applied to the control port Q_MOD. In this exemplary embodiment, the first and second digital data signals are independent external control signals that may be generated, for example, by "splitting" an external digital data stream to be transmitted into odd and even bits using techniques known to those of ordinary skill in the art. The MSK modulation doubles the data rate over BFSK for a fixed FM shift frequency "w".

In the exemplary embodiments of FIGS. 3A and 4A, out-of-band spurious emissions can be minimized by synchronizing the I_MOD and/or Q_MOD control signal inputs with the respective sinusoidal I and Q input signals such that the polarity switching occurs at the zero crossing point of the sinusoid I and Q signals. In particular, in the exemplary embodiments of FIGS. 3A and 4A, a low-splatter transmission signal can be achieved by synchronizing the conjugation or sign-changing in the Q-channel at the time point where the Q signal input sin(wt) waveform cross zero and synchronizing the conjugation or sign-changing in the I-channel at the time point where the I signal input cos(wt) waveform cross zero. Such synchronization minimizes discontinuities (amplitude or phase) in the modulated waveform and realizes a phase-continuous FSK switch.

By way of specific example, assume the quadrature modulation circuit (110) is configured for BFSK modulation as discussed with reference to FIG. 3A, where modulation at a 1 Gb/s data rate is realized using sinusoid I and Q input tones of $\cos(2\pi 500e^6 t)$ and $\sin(2\pi 500e^6 t)$, respectively, where the IQ input signals cross zero at a period of 1ns. The zero crossing point can be synchronized with 1 Gb/s digital data signals applied to the I_MOD and/or Q_MOD control input using known methods so as to realize phase continuous FSK modulation. It is to be understood that the zero crossing point could also be synchronized with a 500 Mb/s data signal, or a 250 Mb/s data signal, or any integer divisor of 1 Gb/s.

In general, synchronous switching between the quadrature sinusoidal I and Q input signals and the transitions in respective data signals applied to the I_MOD and Q_MOD control inputs can be implemented by locking the frequency of the digital data signal and the IQ input signals, cos(wt) and sin(wt), using various techniques. For instance, phase lock can be accomplished using a clock-and-data recovery PLL to generate a clock from a high rate serial data stream, which can then be used to create the IQ input signals cos(wt) and sin(wt) using either a quadrature divider, or a divider and poly-phase network. The IQ input signals cos(wt) and sin(wt) can be used to re-clock the digital data signal(s) (applied at I_MOD and/or Q_MOD) at their zero crossing points to provide phase synchronous digital data signals which transition at the zero crossings of the respective IQ input signals cos(wt) and sin (wt).

It is to be understood that FSK modulation can be achieved with non-locked data signals (I_MOD, Q_MOD) and IQ input signals cos(wt) and sin(wt), but at the cost of higher spectral splatter due to possible non-continuous phase switching. In this regard, in another exemplary embodiment of the invention, the width of spectrum splatter from phase slope discontinuity inherent in FSK modulation transmission can be limited by employing a band-limiting function following the IQ mixers (111) and (112) as is common employed in radio transmission systems (e.g., applying RLC filter at the output load of the mixers).

Figure 3B:
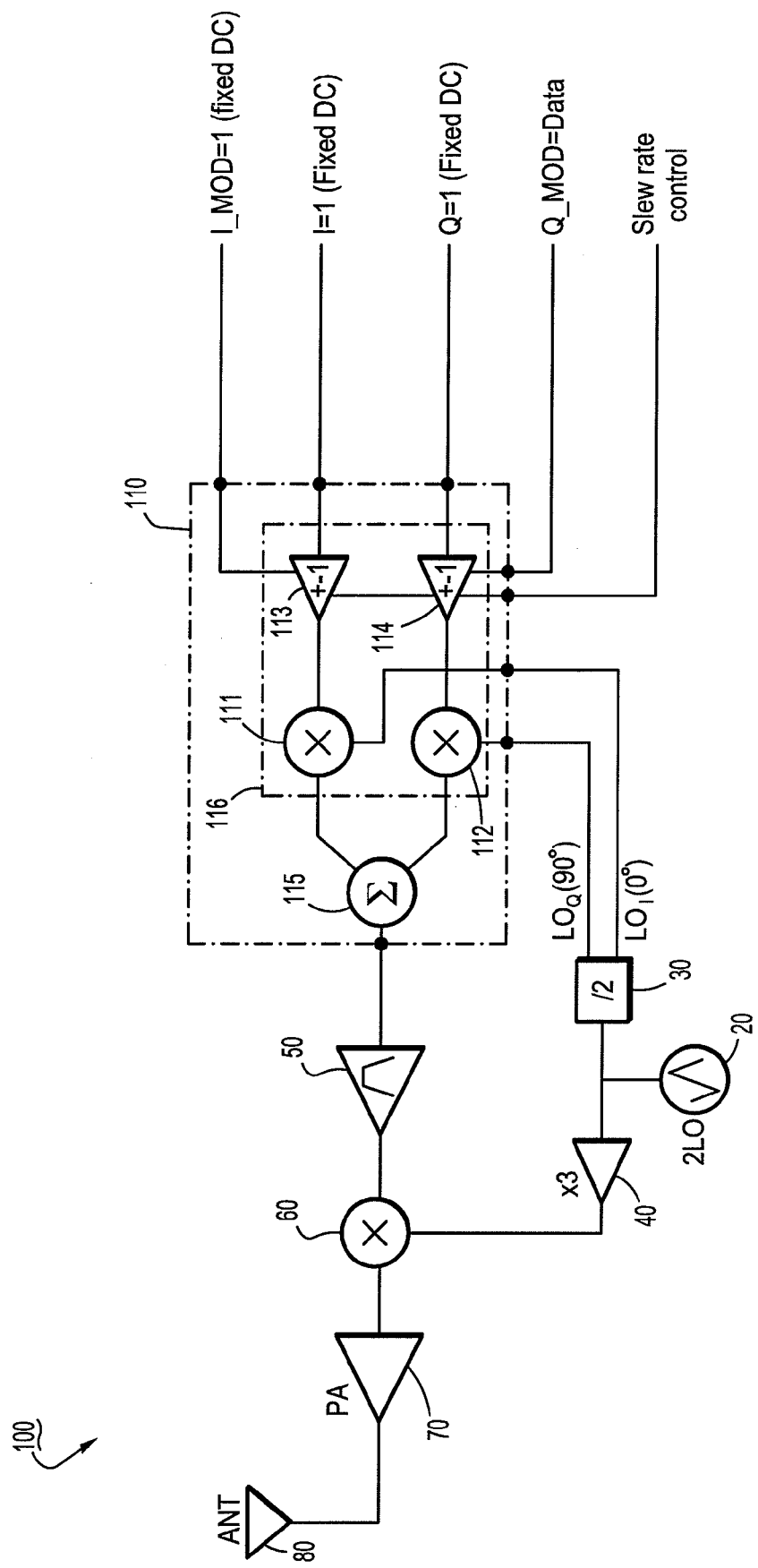
FIG. 3B is a schematic block diagram of an integrated radio transmitter having a quadrature modulation system configured for BPSK modulation according to an exemplary embodiment of the invention.

FIG. 3B is a schematic block diagram illustrating an integrated radio transmitter having a quadrature modulation system configured for BPSK modulation according to an exemplary embodiment of the invention. In particular, FIG. 3B illustrates the exemplary integrated radio transmitter (100) of FIG. 2 where the quadrature modulator (110) is configured for BPSK modulation. In general, PSK (phase-shift keying) is a digital modulation method that involves modulating the phase of carrier signal (e.g., LO signal). With BPSK modulation, two phases separated by 180 degrees are used to represent a binary "1" and binary "0" in a digital data control stream, e.g., binary data is conveyed at $\cos(w_{LO}t)$ for binary "0" and at $\cos(w_{LO}t+\pi)$ or $-\cos(w_{LO}t)$ for binary "1". In operation, BPSK modulation in FIG. 3B is achieved by applying fixed-level DC voltages to the IQ baseband ports and the control port I_MOD, and applying a digital data signal to the Q_MOD control port. This results in a modulated signal Vout (IF signal) at the output of the summing circuit (115) having, in effect, a frequency of $f_{LO}$ with an amplitude that switches polarity at each level transition of the digital data stream (control data) applied to the Q_MOD input.

Figure 4B:
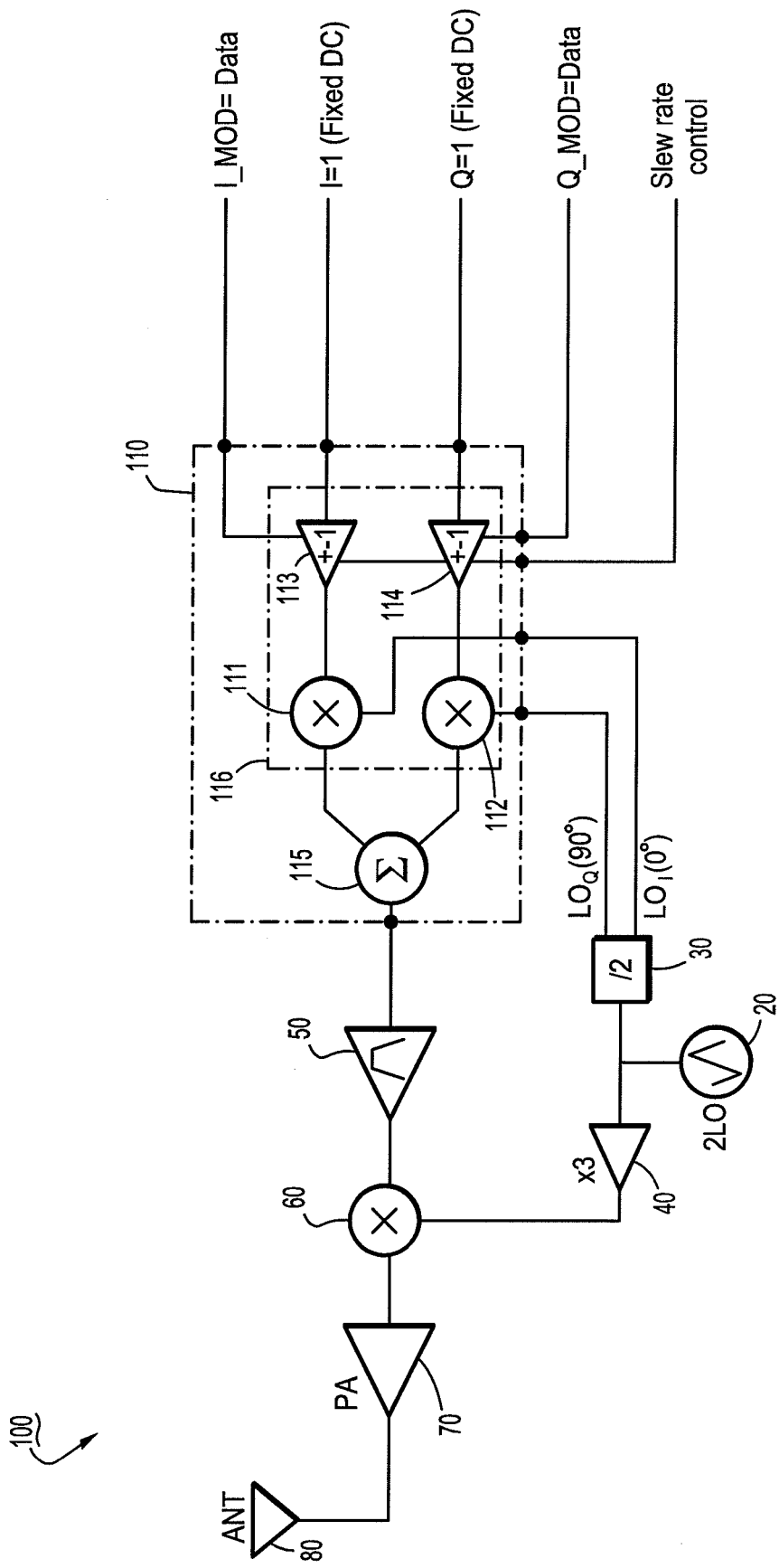
FIG. 4B is a schematic block diagram of an integrated radio transmitter having a quadrature modulation system configured for QPSK modulation according to an exemplary embodiment of the invention.

FIG. 4B is a schematic block diagram illustrating an integrated radio transmitter having a quadrature modulation system configured for QPSK modulation according to an exemplary embodiment of the invention. In particular, FIG. 4B illustrates the exemplary integrated radio transmitter (100) of FIG. 2 where the quadrature modulator (110) is configured for QPSK modulation. In this exemplary embodiment, similar to the BPSK modulation mode of FIG. 4A, fixed-level DC voltages are applied to the IQ baseband ports and quadrature local oscillator (carrier) signals with frequency $f_{LO}$ are applied to the LO inputs of the IQ mixers (111) and (112). For QPSK modulation, sign modulation control signals are applied to both the I_MOD and Q_MOD control ports to provide polarity switching in the I-channel as a function of a first digital data signal (I-channel digital data signal) applied to the control port I_MOD and switching the polarity in the Q-channel as a function of a second digital data signal (Q-channel digital data stream) applied to the control port Q_MOD. In this exemplary embodiment, the first and second digital data signals are independent external control signals that may be generated, for example, by "splitting" an external digital data stream to be transmitted into odd and even bits using techniques known to those of ordinary skill in the art. With QPSK modulation, four phases are used to encode two bits per symbol, which can double the data of BPSK, as is understood by those of ordinary skill in the art. Further, the differential forms of BPSK and QPSK, namely DBPSK and DQPSK, can readily be generated by precoding the external digital data streams according to methods well established in the art. The differential forms of modulation are often preferred to eliminate the need to recover an absolute phase reference at the receiver. Further, OQPSK, or offset QPSK, can be generated by staggering the Q sign control by ½ bit time from the I sign control. OQPSK modulation is sometimes preferred to lower the peak to average power ratio of the transmitted modulation signal.

Figure 5:
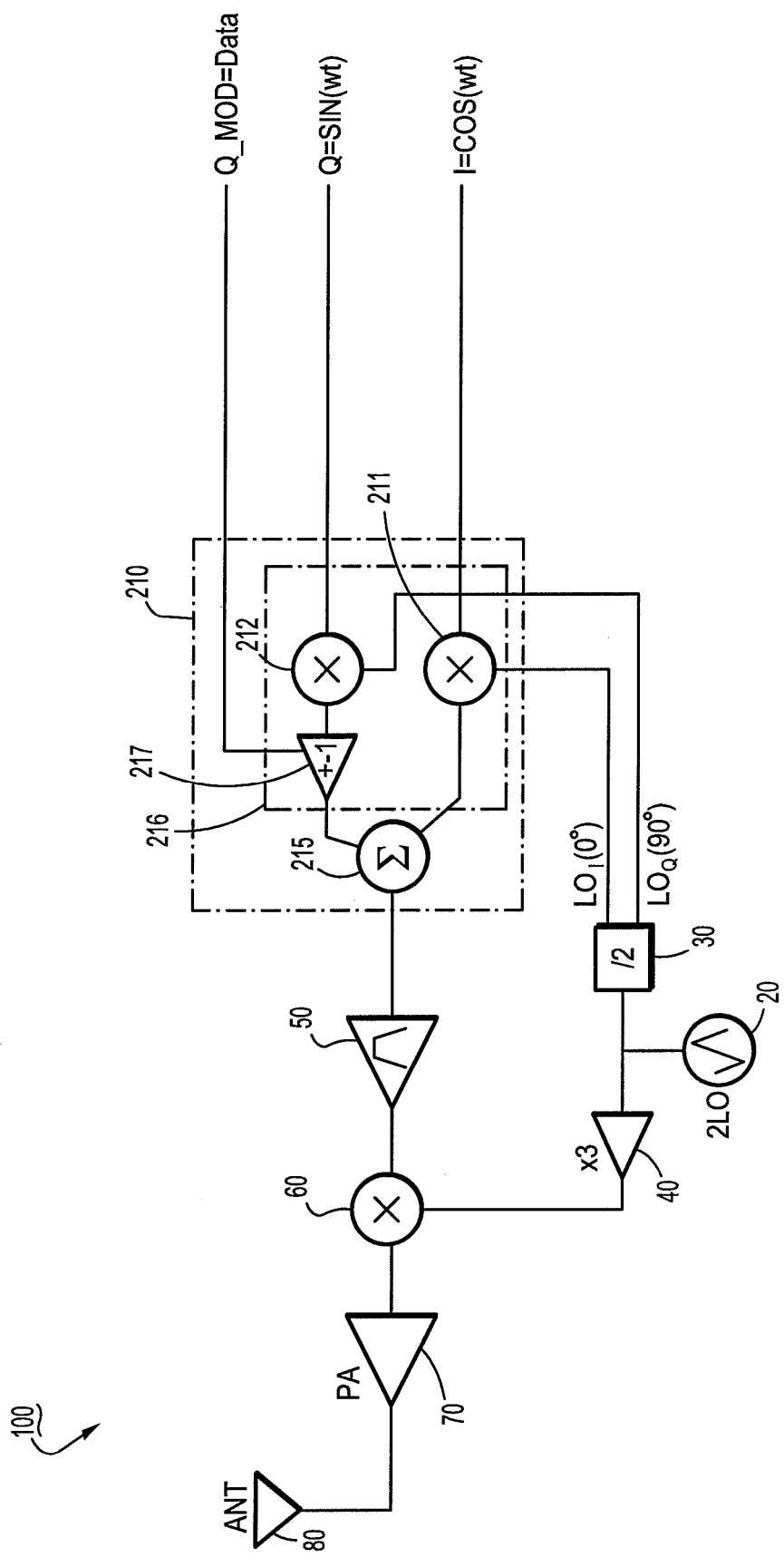
FIG. 5 is a schematic block diagram of an integrated radio transmitter having a quadrature modulation system configured for FSK modulation according to another exemplary embodiment of the invention.

FIG. 5 is a schematic block diagram illustrating an integrated radio transmitter having a quadrature modulation system according to another exemplary embodiment of the invention. In particular, FIG. 5 illustrates the exemplary integrated radio transmitter (100) of FIG. 2 having a quadrature modulator (210) according to another exemplary embodiment of the invention, where sign modulation control is applied to the RF output of the Q-channel mixer (212). The quadrature modulator (210) generally comprises a summing circuit (215) and an integrated IQ mixer/sign modulation circuit (216). The integrated IQ mixer and sign modulation circuit (216) comprises a first mixer (211), a second mixer (212) and sign modulator (217). FIG. 5 illustrates an exemplary embodiment of a quadrature modulator having an integrated mixer and sign modulation circuit (216) where sign modulation is applied to the RF output of the Q-channel mixer (212) to provide FSK modulation. As depicted in FIG. 5, for FSK modulation, analog quadrature signals (I and Q) are input to the IQ baseband input ports and a digital data signal is input on the Q-MOD control input to control sign modulation in the Q-channel, thereby achieving BFSK modulation similar to that discussed above with reference to FIG. 3A.

It is to be understood that the exemplary embodiments of FIGS. 2, 3A, 3B, 4A, 4B and 5 are high level system diagrams that illustrate conceptual frameworks for implementing broadband multi-mode modulation systems based on IQ modulation architectures that are modified to include integrated mixer/sign modulation circuits that enable broadband FSK and PSK modulations using gigabit digital data signals to control polarity switching at input/output ports of IQ mixers. For illustrative purposes, transistor-level implementations of multi-mode quadrature modulation circuits according to exemplary embodiments of the invention will be discussed with reference to FIGS. 6~10. FIGS. 6~10 illustrate quadrature modulation circuits in which IQ mixers are implemented using double balanced active Gilbert mixer frameworks that are modified to include integrated sign modulation control circuits to control polarity switching in response to digital data signals.

Figure 6:
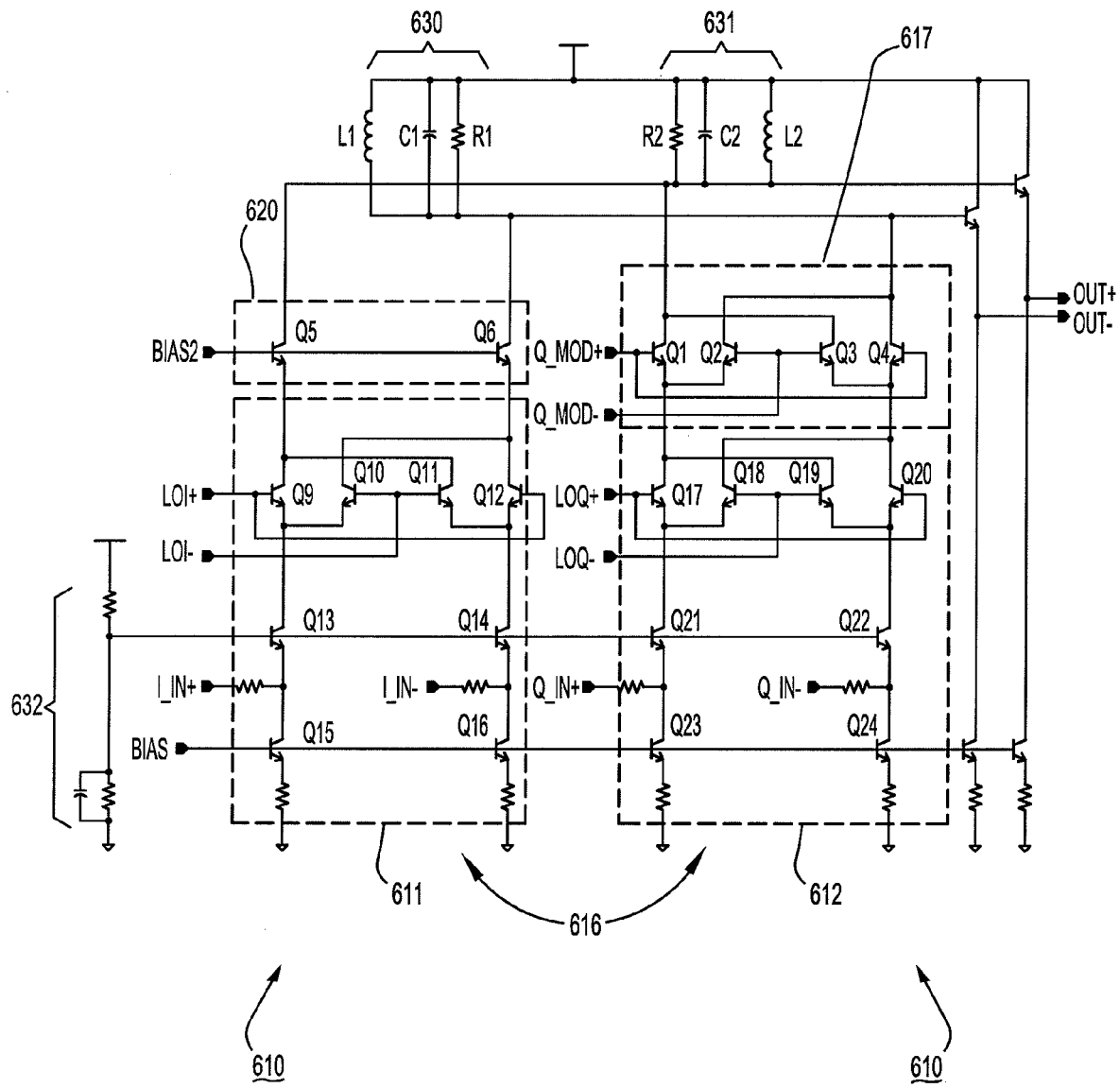
FIG. 6 is a schematic circuit diagram of a quadrature modulator having an integrated mixer and sign modulation topology according to an exemplary embodiment of the invention.

FIG. 6 is a schematic circuit diagram of a quadrature modulator having an integrated mixer and sign modulation topology, according to an exemplary embodiment of the invention. In particular, FIG. 6 illustrates an exemplary embodiment of a quadrature modulator (610) comprising an active mixer topology having an integrated Gilbert mixer and sign modulator framework according to an exemplary embodiment of the invention. FIG. 6 illustrates an exemplary embodiment of the quadrature modulator (210) of FIG. 5 implemented using bipolar junction transistors, e.g., using a SiGe BiCMOS process technology. In general, the quadrature modulator (610) comprises a double-balanced IQ mixer (616) formed of two double-balanced mixers including an I-channel mixer (611) (or I-mixer) and a Q-channel mixer (612) (Q-mixer), an integrated sign modulation circuit (617) at the output of the Q mixer (612), and a DC level set (cascode) circuit (620) at the output of the I mixer (611).

In general, the I-mixer (611) comprises transistors (Q9~Q16) and the Q-mixer (612) comprises transistors (Q17~Q24). The I and Q mixers (611) and (612) comprise respective baseband input stages formed by transistors (Q13~Q16) and (Q21~Q24), respectively, and mixing cores formed by transistors (Q9~Q12) and (Q17~Q20), respectively. The input stage of the I-mixer (611) comprises a transconductance (amplification) stage formed by transconductance pairs (Q13, Q14), which provides a common-base amplifier input stage for differential I-channel inputs (I_IN+/I_IN−) applied at the emitter terminals of transistor Q13 and Q14. Similarly, the input stage of the Q-mixer (612) comprises a transconductance (amplification) stage formed by transconductance transistor pairs (Q21, Q22), which provide a common-base amplifier input stage for differential Q-channel inputs (Q_IN+/Q_IN−) applied at the emitter terminals of transistors Q21 and Q22.

A bias network (632) provides a DC bias voltage to the common-base-biased transistors (Q13, Q14) in the input stage of the I-mixer (611) and to the common-base-biased transistors (Q21, Q22) in the input stage of the Q-mixer (612). The bias network (632) further includes current sources (Q15 and Q16) in the input stage of the I-mixer (611) and current sources (Q23 and Q24) in the input stage of the Q-mixer (612), where a common DC BIAS voltage is applied to base terminals of the current sources (Q15, Q16 Q23, and Q24). The bias network (632) and current sources (Q15, Q16 Q23, and Q24) are designed to control the current operating point for the active devices in the IQ mixers (611) and (612).

Furthermore, the mixing cores of the IQ mixers (611) and (612) are formed by a set of four cross-connected transistors (Q9~Q12) and (Q17~20), respectively, which operate as a fully balanced, phase reversing current switch. Differential in-phase LO signal input ports (LOI+/LOI−) are connected to the base terminals of transistors (Q9~Q12) and differential quadrature-phase LO signal input ports (LOQ+/LOQ−) for the Q-channel are connected to the base terminals of transistors (Q17~Q20), as shown.

The output currents of the Q-mixer (612) are routed through the integrated sign modulator circuit (617) formed by a plurality of transistors (Q1-Q4), to allow polarity switching at the output port of the Q-mixer (612) in response to differential control signals input to the Q_MOD+ and Q_MOD− control ports. The output currents of the I-mixer (611) are routed through the cascode circuit (620) comprising a pair of cascode devices (Q5 and Q6) having a bias voltage BIAS2 applied to the base terminals of the cascode devices (Q5 and Q6). The voltage on BIAS2 is preferably held at the same DC level as the high logic level for the control signals applied to control ports Q_MOD+/Q_MOD− so that the outputs of the IQ mixers (611) and (612) are at the same DC level. The quadrature modulator (610) further comprises bandpass filters (630) and (631) formed by parallel elements R1/L1/C1 and R2/L2/C2, respectively, which provide output loads for the respective I and Q channel outputs of the integrated IQ mixer/sign modulation circuit (616).

The exemplary quadrature modulator (610) can operate in one of various modulation modes similar to that discussed above with reference to FIGS. 3A and 5, for example. Furthermore, in one exemplary embodiment; the switching control signals applied to the control ports Q_MOD+/Q_MOD− are synchronized with the zero crossings of the I-channel input signals applied to input ports (I_IN+/I_IN−) and the Q-channel input signals applied to input ports (Q_IN+/Q_IN−), to minimize out-of-band spurious emissions. In addition, the filters (630) and (631) can be designed to suppress out-of-band spurious emissions at the outputs of the IQ mixers.

Figure 7:
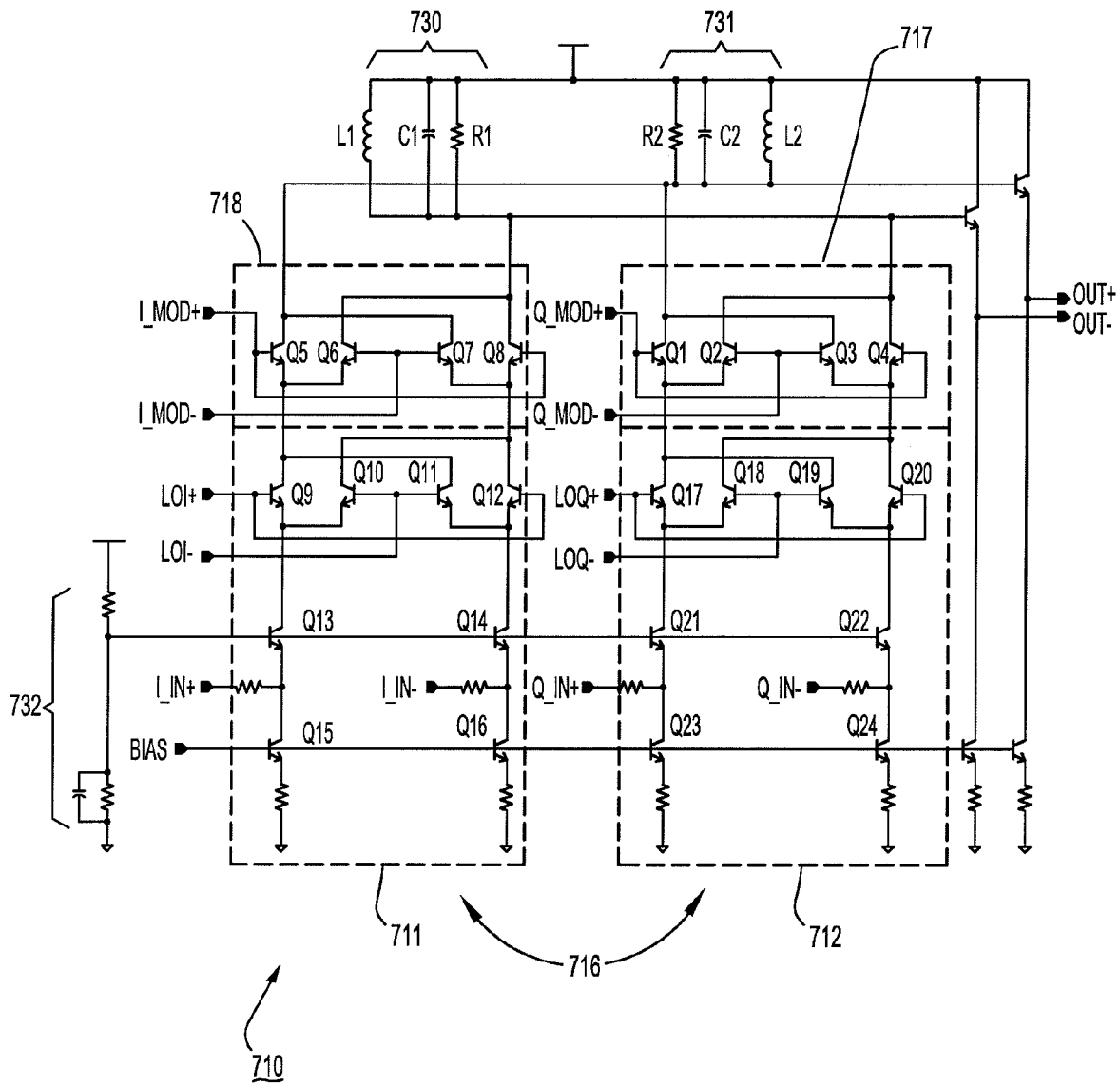
FIG. 7 is a schematic circuit diagram of a quadrature modulator having an integrated mixer and sign modulation topology according to another exemplary embodiment of the invention.

FIG. 7 is a schematic circuit diagram of a quadrature modulator having an integrated mixer and sign modulator topology according to another exemplary embodiment of the invention. FIG. 7 illustrates an extension of the exemplary embodiment of the quadrature modulator (610) of FIG. 6 to provide polarity switching in both the I and Q channels of the modulator (710) at the output of the I and Q mixers. In particular, the quadrature modulator (710) comprises a double-balanced IQ mixer (716) formed of two double-balanced mixers including an I-channel mixer (711) (I-mixer) and a Q-channel mixer (712) (Q-mixer), an integrated sign modulation circuit (717) at the output of Q mixer (712), filters (730) and (731), and bias network (732) similar in structure and operation to those corresponding components in the quadrature modulator (610) of FIG. 6. The quadrature modulator (710) further includes an integrated sign modulator (718) comprising a plurality of switches (Q5-Q8), which allow polarity switching at the output of the I-mixer (711) in response to differential control signals applied to control port (I_MOD+, I_MOD−).

The exemplary quadrature modulator (710) can operate in one of various modulation modes similar to that discussed above with reference to FIGS. 3A and 4A. For example, BFSK or MSK modulation can be achieved by applying differential analog quadrature sinusoidal signals to the baseband input ports (I_IN+/I_IN−) and (Q_IN+/Q_IN−), applying quadrature LO signals to the LO ports (LOI+/LOI−) and LOQ+/LOQ−) and by applying sign modulation control signals to one or both control ports (I_MOD+/I_MOD−) and (Q_MOD+/Q_MOD−) to enable BFSK or MSK modulation. In addition, to minimize out-of-band spurious emissions, the differential sign modulation control signals applied to the control ports (I_MOD+/I_MOD−) can be synchronized with the zero crossings of the differential I-channel input signals applied to input ports (I_IN+/I_IN−), and likewise, the differential sign modulation control signals applied to the control ports (Q_MOD+/Q_MOD−) can be synchronized with the zero crossings of the differential Q-channel input signals applied to the input ports (Q_IN+/Q_IN−).

Figure 8:
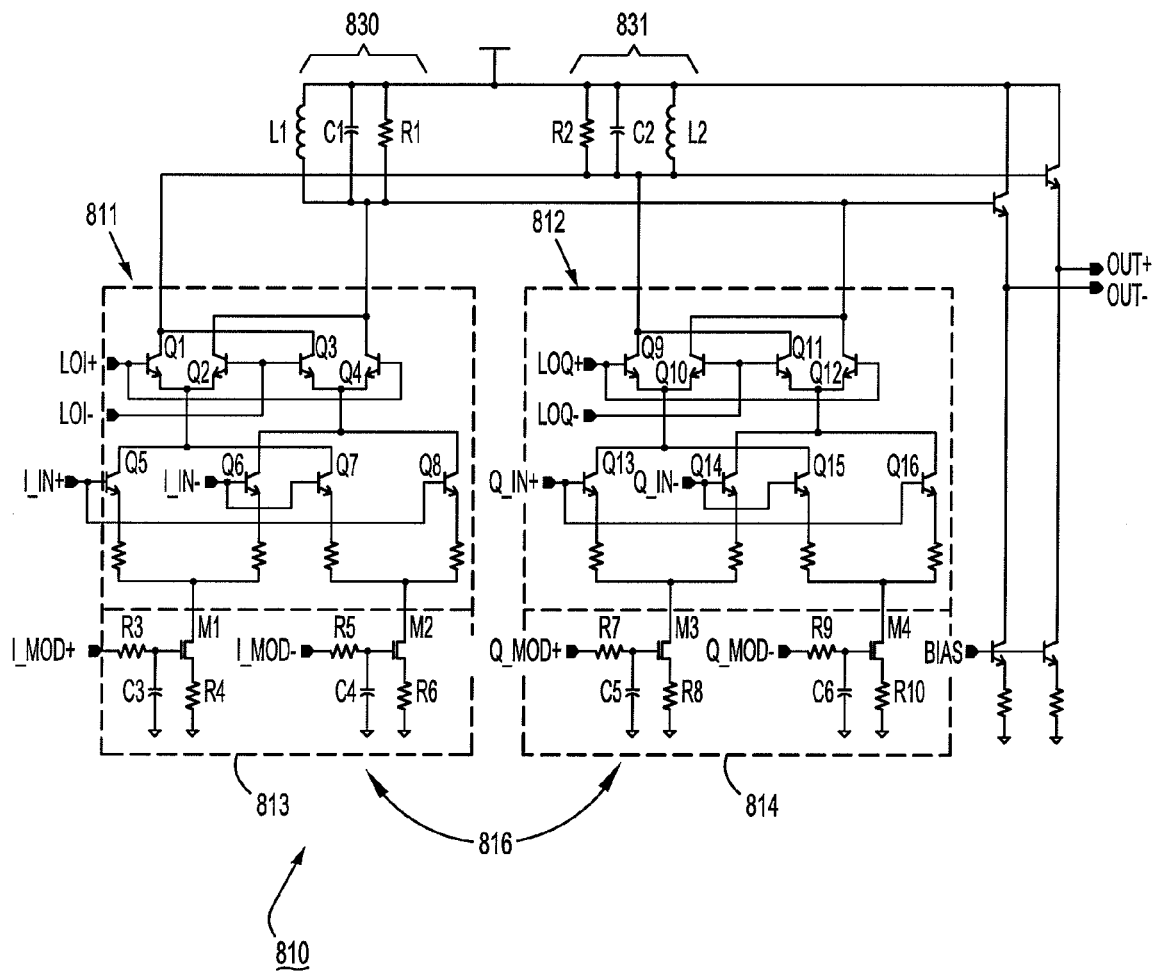
FIG. 8 is a schematic circuit diagram of a quadrature modulator having an integrated mixer and sign modulation topology according to another exemplary embodiment of the invention.

FIG. 8 is a schematic circuit diagram of a quadrature modulator having an integrated mixer and sign modulation topology according to another exemplary embodiment of the invention. In particular, FIG. 8 illustrates an exemplary embodiment of a quadrature modulator (810) comprising an active mixer topology having an integrated Gilbert mixer and sign modulator framework according to an exemplary embodiment of the invention, which is implemented using bipolar junction transistors, e.g., using a SiGe BiCMOS process technology. FIG. 8 illustrates an exemplary embodiment of the quadrature modulator (110) of FIG. 2 providing polarity switching at the baseband input ports of the IQ mixers.

In general, the quadrature modulator (810) comprises a double-balanced IQ mixer (816) formed of two double-balanced mixers including an I-channel mixer (811) (I-mixer) and a Q-channel mixer (812) (Q-mixer), and having integrated sign modulation circuits (813) and (814) to control polarity switching of signals applied to the input ports (I_IN+/I_IN−) and (Q_IN+/Q_IN−) of respective IQ mixers (811) and (814), wherein the sign modulation circuits (813) and (814) are formed as part of bias networks for respective I and Q mixers (811) and (812) to control commutation speed and minimize the generation of out-of-band spurs.

In general, the I-mixer (811) comprises transistors (Q1~Q8) and the Q-mixer (812) comprises transistors (Q9~Q16). The IQ mixers (811) and (812) comprise respective baseband input stages formed by transistors (Q5~Q8) and (Q13~Q16), respectively, and mixing cores formed by transistors (Q1~Q4) and (Q9~12), respectively. Differential in-phase LO signal input ports (LOI+/LOI−) are connected to the base terminals of transistors (Q1~Q4) and differential quadrature-phase LO signal input ports (LOQ+/LOQ−) are connected to the base terminals of transistors (Q9~Q12), as shown.

The input stage of the I-mixer (811) comprises a transconductance (amplification) stage formed by transistors (Q5~Q8), which provide a degenerated differential pair amplifier input stage for differential I-channel inputs (I_IN+) and (I_IN−) applied at the base terminals of transistors (Q5, Q8) and (Q6, Q7), respectively. Similarly, the input stage of the Q-mixer (812) comprises a transconductance (amplification) stage formed by transistors (Q13~Q16), which provide a degenerated differential pair amplifier input stage for differential Q-channel inputs (Q_IN+) and (Q_IN−) applied at the base terminals of transistors (Q13, Q16) and (Q14, Q15), respectively. It is to be understood that the transconductor stages in FIG. 8 can be implemented as common-base transconductors as in FIGS. 6 and 7.

In the I-mixer (811), duplicate transconductor pairs (Q5-Q6) and (Q7-Q8) are wired such that their baseband inputs are of opposite polarity—i.e., the base terminals of Q5 and Q6 are connected to I_IN+ and I_IN−, respectively, and the base terminals of Q7 and Q8 are connected to I_IN+ and I_IN−, respectively. In addition, the bias currents for the transconductor pairs (Q5-Q6) and (Q7-Q8) are provided by separate switches M1 and M2, respectively, in the sign modulator (813). Similarly, in the Q-mixer (812), duplicate transconductor pairs (Q13-Q14) and (Q15-Q16) are wired such that their baseband inputs are of opposite polarity and such that the bias currents for the duplicate transconductor pairs (Q13-Q14) and (Q15-Q16) are provided by separate switches M3 and M4, respectively, in the sign modulator (814).

The polarity of the differential I-channel signal applied to the input ports (I_IN+/I_IN−) can be reversed by applying a differential sign control signal to control ports (I_MOD+/IMOD−) connected to the gate terminals of switching devices M1 and M2. The rise and fall times of the voltages at the gate terminals of switching devices M1 and M2 can be controlled to gradually switch between the two polarities of the I-channel baseband input signals at input ports (I_IN+/I_IN−), thereby minimizing spectral splatter. For example, the transition time between the two polarities at the baseband inputs can be controlled by the transconductance of the degenerated current sources (M1 degenerated by R4, M2 degenerated by R6) and by the time constant of the optional RC filter networks R3-C3 and R5-C4.

Similarly, the polarity of the differential Q-channel input signal applied to the input ports (Q_IN+/Q_IN−) can be reversed by applying a differential sign control signal to control ports (Q_MOD+/Q_MOD−) connected to the gate terminals of switching devices M3 and M4. The rise and fall times of the voltages at the gate terminals of M3 and M4 can be controlled to gradually switch between the two polarities at the baseband inputs, thereby minimizing spectral splatter. For example, the transition time between the two polarities at the baseband inputs can be controlled by the transconductance of the degenerated current sources (M3 degenerated by R8, M4 degenerated by R10) and by the time constant of the optional RC filter networks R7-05 and R9-C6.

Figure 9:
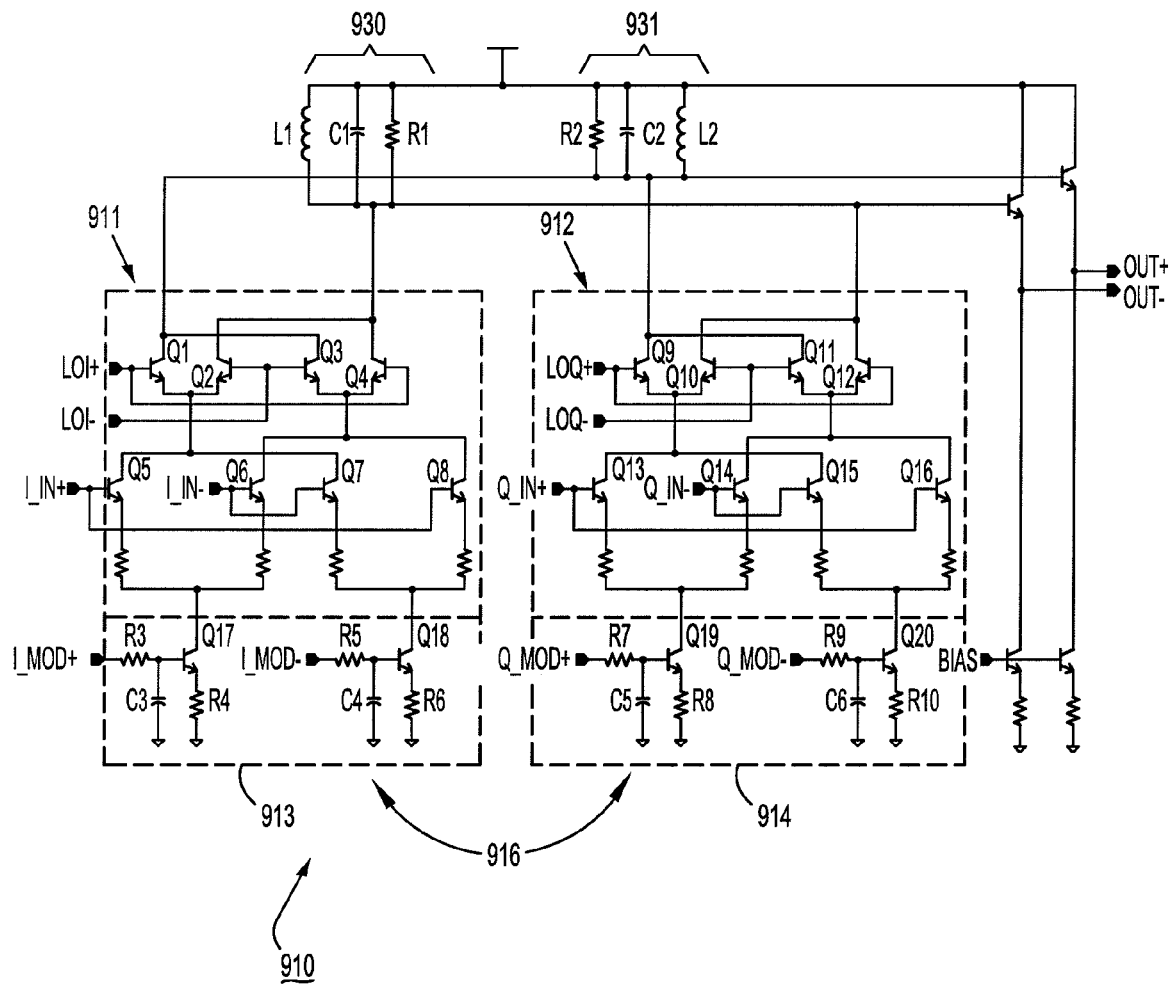
FIG. 9 is a schematic circuit diagram of a quadrature modulator having an integrated mixer and sign modulation topology according to another exemplary embodiment of the invention.

FIG. 9 is a schematic circuit diagram of a quadrature modulator having an integrated mixer and sign modulator topology according to another exemplary embodiment of the invention. In particular, FIG. 9 illustrates an exemplary embodiment of a quadrature modulator (910) comprising a double-balanced mixer (916) formed of two double-balanced mixers including an I-channel mixer (911) (or I-mixer) and a Q-channel mixer (912) (Q-mixer), and mixer output loads formed by filters (930) and (931), respectively. In addition, the mixers (911) and (912) have respective sign modulation circuits (913) and (914) formed as part of bias networks so as to enable polarity switching at the baseband inputs of the IQ mixers. The quadrature modulator (910) has a framework similar to the quadrature modulator (810) discussed with reference to FIG. 8, but where the sign modulator circuits (913) and (914) implement bipolar-transistor current sources (Q17-Q20) in place of the MOSFET switches M1~M4 depicted in FIG. 8. The MOSFET current sources offer more gradual switching between the two signal polarities, which may be desirable at lower frequencies, but the switching may actually be too gradual at higher operating frequencies. At higher operating frequencies, the bipolar transistors (Q17-Q20) in the embodiment of FIG. 9 may be implemented to achieve faster switching.

Figure 10:
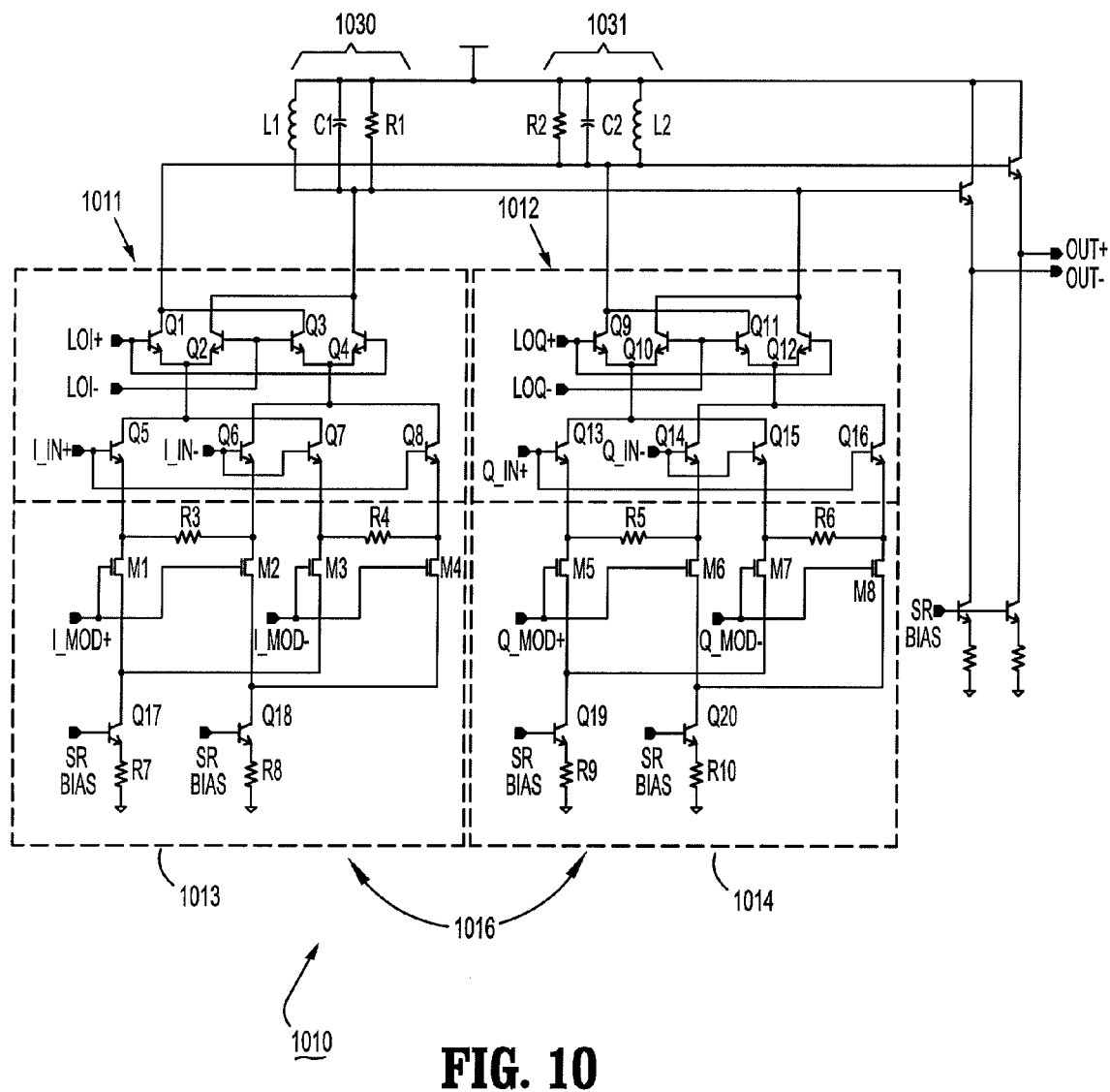
FIG. 10 is a schematic circuit diagram of a quadrature modulator having an integrated mixer and sign modulation topology according to another exemplary embodiment of the invention.

FIG. 10 is a schematic circuit diagram of a quadrature modulator having an integrated mixer and sign modulator topology according to another exemplary embodiment of the invention. In particular, FIG. 10 illustrates a quadrature modulator (1010) comprising a double-balanced mixer (1016) formed of two double-balanced mixers including an I-channel mixer (1011) (or I-mixer) and a Q-channel mixer (1012) (Q-mixer), and output loads formed by RLC filters (1030) and (1031). The mixers (1011) and (1012) have respective sign modulation circuits (1013) and (1014) formed as part of DC bias networks for respective IQ mixers (1011) and (1012), to enable polarity switching of the differential input signals applied at the baseband input ports (I_IN+/I_IN−) and (Q_IN+/Q_IN−).

FIG. 10 illustrates an extension of the exemplary embodiment of FIG. 9, where differential pair amplifiers are implemented to switch the bias current supplied to the complementary transconductors formed by transistors (Q5-Q6) and (Q7-Q8) in the I-mixer (1011) and the complementary transconductors formed by transistors (Q13-Q14) and (Q15-Q16) in the Q-mixer (1012). In particular, for the I-channel mixer (1011), a plurality of MOSFET transistors (M1-M4) are employed to form a differential pair, wherein the sign modulation control ports I_MOD+ is connected to the gate terminals of transistors M1 and M2 and where the control port I_MOD− is connected to the gate terminals of transistors M3 and M4. The source terminals of transistors M1 and M3 are connected together and share a common current source (Q17) and degeneration resistor R7. The source terminals of transistors M2 and M4 are connected together and share a common current source (Q18) and degeneration resistor R8. Similarly, for the Q-channel mixer (1012), a plurality of MOSFET transistors (M5-M8) are employed to form a differential pair, wherein the sign modulation control ports Q_MOD+ is connected to the gate terminals of transistors M5 and M6 and where the control port Q_MOD− is connected to the gate terminals of transistors M7 and M8. The source terminals of transistors M5 and M7 are connected together and share a common current source (Q19) and degeneration resistor R9. The source terminals of transistors M6 and M8 are connected together and share a common current source (Q20) and degeneration resistor R10. A slew rate bias control voltage SRBias is commonly applied to the base terminals of the transistors Q17~Q20.

It the exemplary embodiment of FIG. 10, each input transistor of the differential pairs are implemented as two separate devices. For example, in the I-channel, the transistor pairs M1/M2 and M3/M4, in effect, form two separate input devices of a differential pair. Similarly, in the Q-channel, the transistor pairs M5/M6 and M7/M8, in effect, form two separate input devices of a differential pair. It is to be appreciated that with such design, the degeneration resistors (R3 and R4) of the transconductors formed by Q5-Q6 and Q7-Q8 can be implemented so that they act on the differential AC signal without consuming any DC voltage headroom. Similarly, the degeneration resistors (R5 and R6) of the transconductors formed by Q13-Q14 and Q15-Q16 can be implemented so that they act on the differential AC signal without consuming any DC voltage headroom.

In another exemplary embodiment of the invention, each transistor pair M1/M2, M3/M4, M5/M6 and M7/M8 can be replaced by a single transistor, when the degeneration resistors of the transconductors are implemented as depicted in FIGS. 8 and 9. In another embodiment, the MOS transistors M1~M8 in FIG. 10 (which form the differential pairs) can be replaced with BJT transistors.

The exemplary quadrature modulation circuit (1010) in FIG. 10 was simulated using computer models based the BiCMOS8HP Silicon-Germanium bipolar-CMOS technology of International Business Machines, as cascaded with an FM demodulator circuit as described in U.S. patent application Ser. No. 11/345,159, filed on Jan. 31, 2006, entitled "Receiver and Integrated AM-FM/IQ Demodulators for Gigabit-Rate Data Detection", which is commonly owned and fully incorporated herein by reference. Using sinusoidal, quadrature local oscillator signals (LOI+/LOI− and LOQ+/LOQ−) at a frequency of 9 GHz, and fixed-frequency quadrature sinusoidal signals (I_IN+/I_IN− and Q_IN+/Q_IN−) at 1 GHz, the modulator (1010) was modeled to produce an intermediate-frequency (IF) output signal which varied between 8 and 10 GHz.

Figures 11A, 11B:
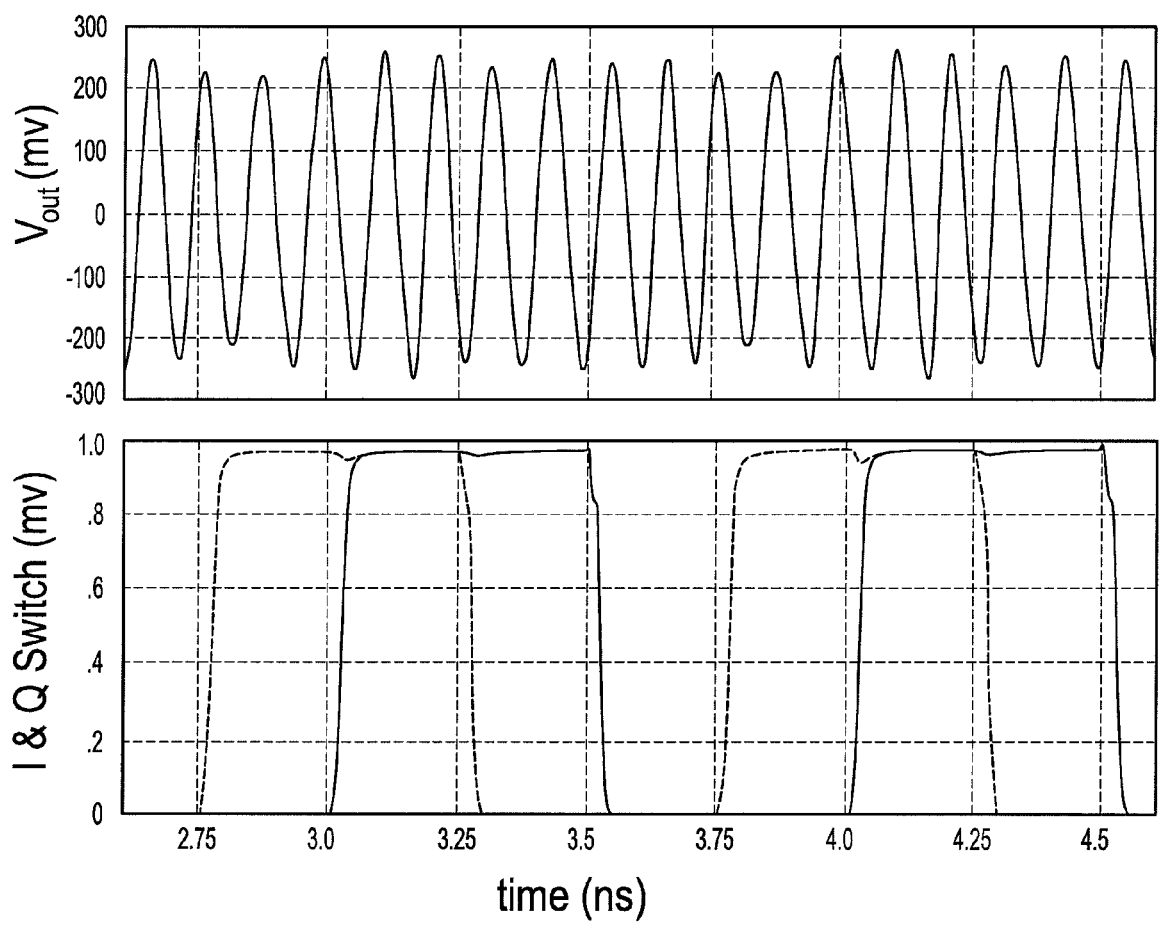
FIGS. 11A, 11B, and 11C are graphical diagrams showing results of computer simulations of the exemplary circuit of FIG. 10.
Figure 11C:
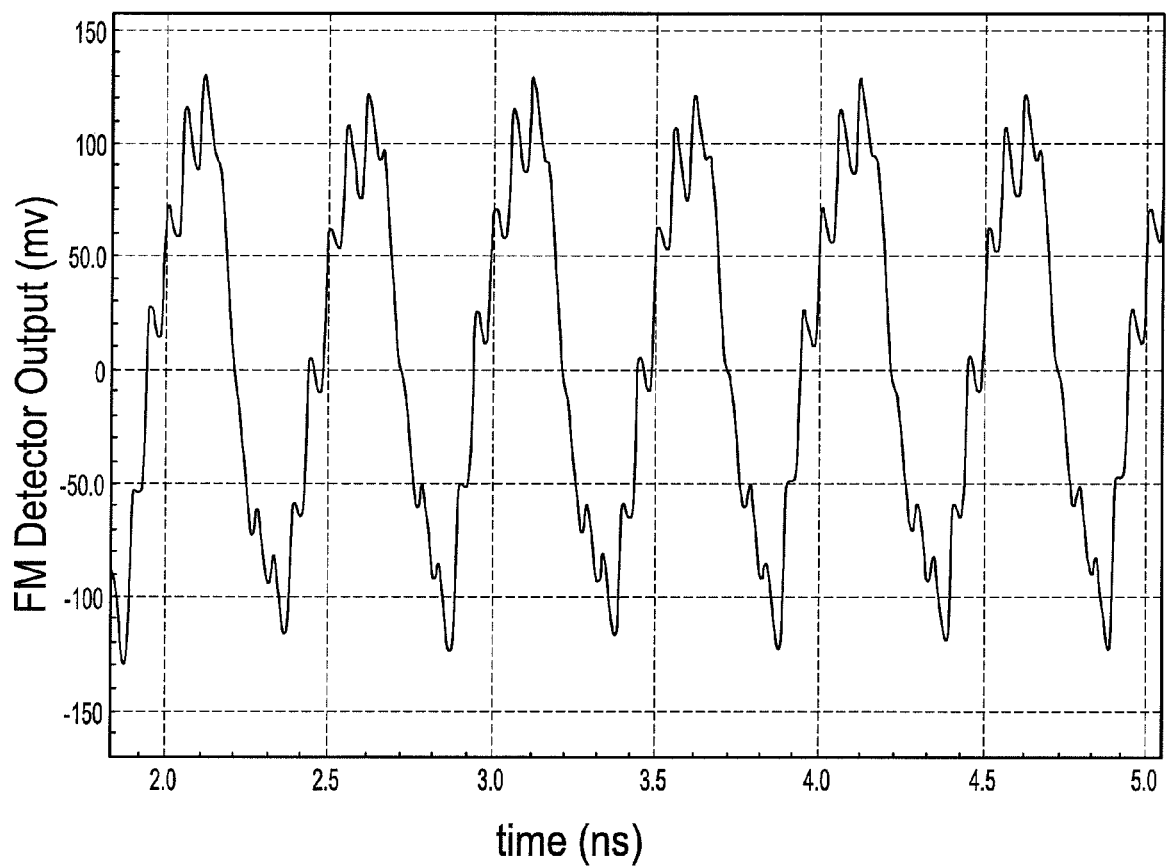

The simulation results are depicted in FIGS. 11A, 11B and 11C. FIG. 11A illustrates a simulated IF output signal, Vout (in millivolts), as a function of time (in nanoseconds). FIG. 11b illustrates simulated modulating input signals applied to ports I_MOD+/I_MOD− (dashed line waveform) and ports Q_MOD+/Q_MOD− (solid line waveform), which are arranged to switch the polarity of the I-channel and Q-channel input signals at every half-cycle of the input signals, at the zero crossing point. In this regard, switching results in 4 transitions per 1 GHz cycle, equivalent to encoding data at 4 Gb/s. In the exemplary embodiment of FIG. 2, the IF output signal Vout would normally be upconverted to the 59-64 GHz carrier frequency, as discussed above. For simulation purposes, however, the IF output signal Vout was connected to the input of an FM demodulator as described in the above-incorporated patent application.

FIG. 11C illustrates the simulated FM detector output waveform (in millivolts) as a function of time (in nanoseconds). FIG. 11C illustrates a 2 GHz sinusoidal output equivalent to a 1010 pattern at 4 Gb/s. The simulation provides one illustrative example of how to utilize an IQ modulator with integrated sign polarity control to realize a variety of FSK modulations. It is to be appreciated that as evidenced by the IF output signal (FIG. 11b), even at the exemplary high data rate, the transistor implementation of the quadrature modulator (1010) achieves a constant-envelope and phase continuous transmitted signal.

Figure 12:
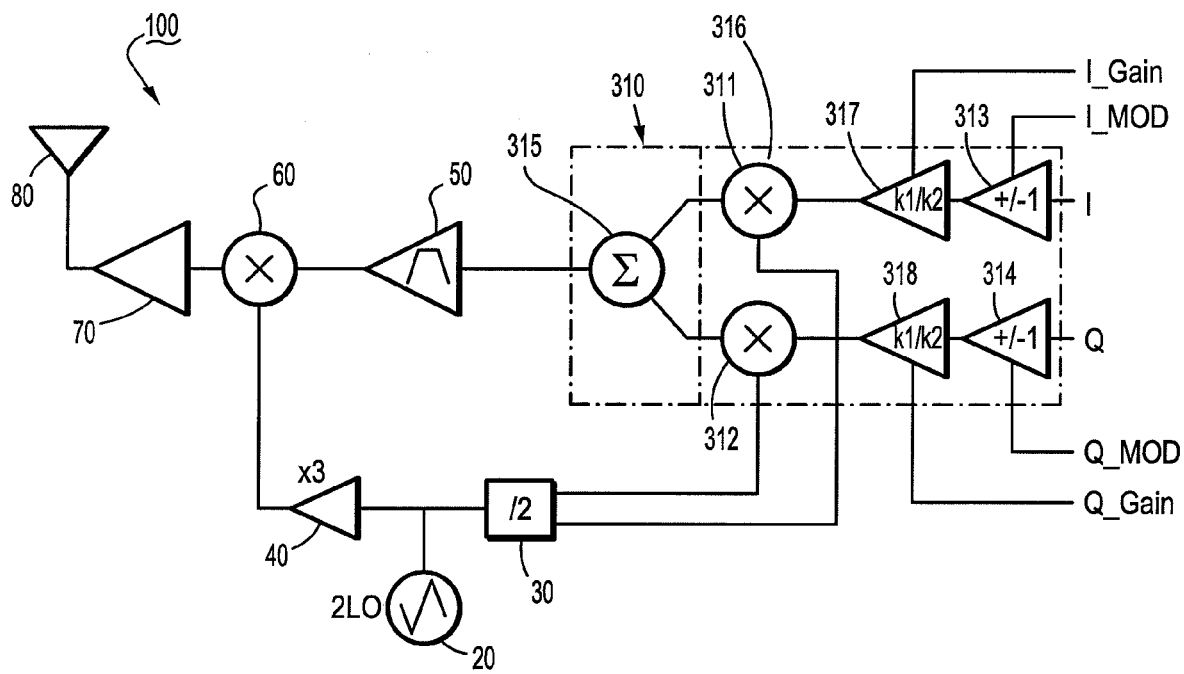
FIG. 12 is a schematic block diagram of an integrated radio transmitter which implements a quadrature modulation system that can support multiple ASK, FSK and PSK modulation modes according to an exemplary embodiment of the invention.

FIG. 12 is a schematic block diagram illustrating an integrated radio transmitter having a quadrature modulation system according to an exemplary embodiment of the invention. In particular, FIG. 12 illustrates the exemplary integrated radio transmitter (100) of FIG. 2 having a quadrature modulator (310) according to another exemplary embodiment of the invention, which is configured to support ASK (also called binary amplitude modulation) as well as PSK, FSK and other modulation modes. In general, the quadrature modulator (310) comprises a summing circuit (315) and an IQ mixer circuit (316) integrated with sign control and amplitude control. The integrated IQ mixer circuit (316) comprises an I-channel mixer (311), a sign modulation control circuit (313) and an amplitude modulation control circuit (317). The integrated IQ mixer circuit (316) further includes a Q-channel mixer (312), a sign modulation control circuit (314) and an amplitude modulation control circuit (318). The quadrature modulation circuit (310) comprises control input ports I_Gain and Q_Gain to respective amplitude modulation control circuits (317) and (318), control input ports I_MOD and Q_MOD to respective sign modulation control circuits (313) and (314) and I and Q baseband input ports.

The quadrature modulation circuit (310) of FIG. 12 is essentially an extension of the quadrature modulation circuit (110) of FIG. 2 to include the amplitude modulation control circuits (317) and (318) to support various ASK modulation modes of operation alone or simultaneously with FSK or PSK modulation modes, as will be discussed below.

In the exemplary embodiment of FIG. 12, each amplitude modulation control circuit (317) and (318) is designed to modulate the signal gain at the input of respective mixers (311) and (312) by switching between gain states of k1 and k2 in response to amplitude control signals applied to respective control ports I_Gain and Q_Gain.

The quadrature modulation circuit (310) can support various ASK modulation modes. In general, ASK modulation involves varying the amplitude of the LO signal to represent binary data. In one exemplary embodiment, the quadrature modulation circuit (310) supports OOK (on-off keying) modulation, wherein a binary "1" is represented by the presence of a modulated output signal (the LO (carrier) signal) ("On" state) and a binary "0" is represented by the absence of a modulated output signal ("Off" state). In particular, on-off keying (OOK) modulation can be realized by designing the amplitude modulation control circuits (317) and (318) to provide gain states of k1=0 and k2=1 (relative to full gain).

In operation, OOK modulation could be obtained by applying quadrature LO signals to the LO ports of the mixers (311) and (312), applying fixed-level DC signals to the sign control inputs Q_MOD and I_MOD, applying fixed-level DC signals to the baseband inputs I and Q (level setting), and by applying an amplitude modulation control signal to both amplitude control ports Q_Gain and I_Gain to control the I and Q amplitude. More specifically, for OOK modulation, the DC signal inputs to the I and Q ports would be at DC levels that define the full gain amplitude of the modulated output signal, and the amplitude modulation control circuits (317) and (318) would be commonly controlled by a single digital data signal to provide gain states of k1=0 in response to control bits of logic "0" and gain states of k2=1 in response to control bits of logic "1", for example. In this embodiment, the DC signals applied to the I_MOD and Q_MOD control ports would be maintained at fixed logic states while the modulation control would be applied to the I_Gain and Q_Gain control ports to generate an OOK signal.

It is to be appreciated that OOK modulation can be achieved by modifying the quadrature mixer to a non-quadrature mixer by inputting the same LO signal to the LO ports of the mixers (311) and (312), and then controlling the sign modulation in the I or Q channel to cause the output of the mixers (311) and (312) to be constructively or destructively added and, thereby, generating an OOK output signal. In other words, in this exemplary embodiment, OOK modulation would be realized using sign modulation control, rather than amplitude modulation control. This approach can readily implement the integrated slew rate control mechanism of the sign modulation control circuitry to limit the slew rate and resulting bandwidth of the OOK signal In another exemplary embodiment, the quadrature modulation circuit (310) can support simultaneous modulation modes of operation such as 2-level ASK and FSK modulation.

In particular, 2-level ASK modulation can be realized by designing the amplitude modulation control circuits (317) and (318) to provide gain states of k1=0.5 and k2=1 (relative to full gain). In operation, simultaneous ASK/FSK modulation could be obtained by applying quadrature LO signals to the LO ports of the mixers (311) and (312), applying a single amplitude modulation control signal to both amplitude control ports Q_Gain and I_Gain to control the I and Q amplitude (supporting 2-level ASK). Moreover, FSK modulation could be realized simultaneously with ASK by applying quadrature sinusoidal signals to the I and Q baseband input ports, and applying a sign modulation control signal to one or both sign control inputs Q_MOD and I_MOD (to support BFSK or MSK modulation) In other words, for simultaneous ASK/FSK modulation, an external digital data signal to be transmitted can be used to generate an digital amplitude modulation control signal (which is commonly applied to the I_Gain and Q-Gain ports) and one or more sign modulation control signals that are independently applied to the I_MOD and/or Q_MOD control ports to control polarity switching to achieve BFSK or MSK modulation, as previously described.

In another exemplary embodiment, the quadrature modulation circuit (310) supports various QAM modulation modes. For example, 16-QAM can be realized by simultaneous operation of 2-level ASK and PSK modulation modes. In particular, 2-level ASK modulation can be realized by designing the amplitude modulation control circuits (317) and (318) to provide gain states of k1=0.333 and k2=1 (relative to full gain). In operation, simultaneous ASK/PSK modulation could be obtained by applying quadrature LO signals to the LO ports of the mixers (311) and (312) and applying independent amplitude modulation control signals to the amplitude control ports Q_Gain and I_Gain to independently control the I and Q amplitude (supporting 2-level ASK on each channel). Moreover, PSK modulation could be realized simultaneously with ASK by applying fixed-level DC signals to the IQ baseband input ports (level setting) and applying sign modulation control signals to one or both sign control inputs Q_MOD and I_MOD to support BPSK or QPSK modulation as previously discussed. In other words, for simultaneous ASK/PSK modulation, an external digital data signal to be transmitted can be used to generate two independent digital amplitude modulation control signals that are separately applied to the I_Gain and Q-Gain ports, and one or more sign modulation control signals that are independently applied to the I_MOD and/or Q_MOD control ports to control polarity switching to achieve BPSK or QPSK modulation, as previously described. For QPSK modulation, the control signals applied to control ports Q_MOD and I_MOD would control the polarity switching by changing the sign of I and Q input signals to 1/−1.

Figure 13:
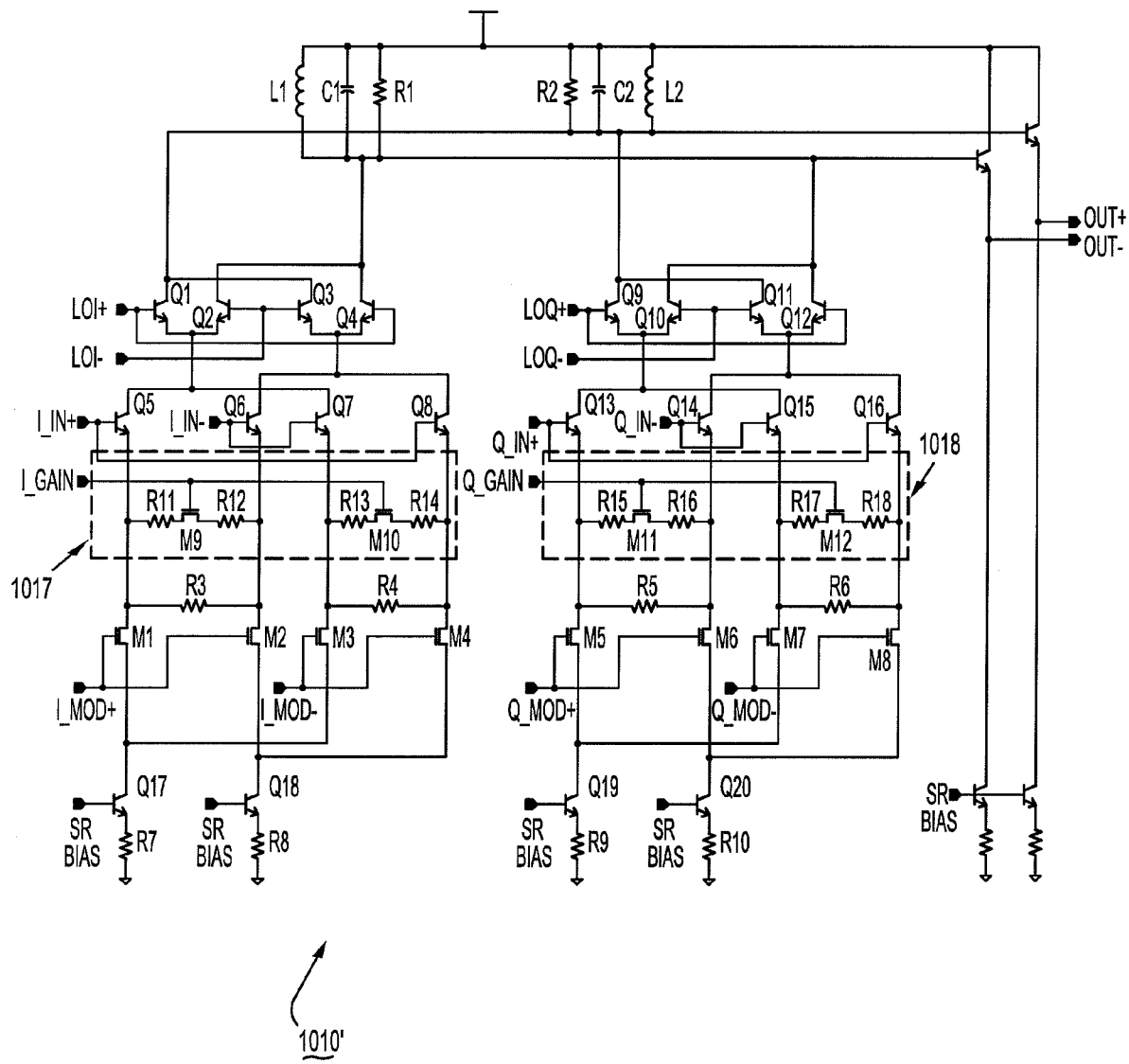
FIG. 13 is a schematic circuit diagram of a quadrature modulator having an integrated mixer, sign modulation and amplitude modulation circuit topology according to an exemplary embodiment of the invention.

FIG. 13 is a schematic circuit diagram of a quadrature modulator having an integrated mixer, sign modulation control and amplitude modulation control circuit according to an exemplary embodiment of the invention. In particular, FIG. 13 illustrates an exemplary transistor-level implementation of the quadrature modulator (310) of FIG. 12. FIG. 13 illustrates a quadrature modulator (1010') similar in framework to the exemplary quadrature modulator (1010) of FIG. 10, but extended to include an I-channel amplitude modulation control circuit (1017) and a Q-channel amplitude modulation control circuit (1018), which are formed as part of the transconductor stages of respective I and Q mixers to control the gain in respective IQ channels.

The I channel amplitude modulation control circuit (1017) comprises a MOS transistor M9 and resistors R11 and R12, which are connected in series to each other and in parallel to the degeneration resistor R3, and a MOS transistor M10 and resistors R13 and R14, which are connected in series to each other and in parallel to the degeneration resistor R4. The gate terminals of the MOS transistors M9 and M10 are commonly connected to the control port I_Gain. Similarly, the Q channel amplitude modulation control circuit (1018) comprises a MOS transistor M11 and resistors R15 and R16, which are connected in series to each other and in parallel to the degeneration resistor R5, and a MOS transistor M12 and resistors R17 and R18, which are connected in series to each other and in parallel to the degeneration resistor R6. The gate terminals of MOS transistors M11 and M12 are commonly connected to the control port Q_Gain.

In operation, digital control signals (commonly or independently) applied to the I_Gain and/or Q_Gain control ports cause the transistors M19~M12 to selectively switch On and Off to change the degeneration resistance and thus switch the transconductor between two gain states. For example, in the I-channel mixer, the MOS transistors M9 and M10 can be commonly controlled by a control signal applied to the I-Gain port to change the value of the degeneration resistance between a first value of R3 and a second value of R3 in parallel with R11+R12, and to change the value of the degeneration resistance between a first value R4 and a second value R4 in parallel with R13+R14. Similarly, in the Q-channel mixer, the MOS transistors M11 and M12 can be commonly controlled by a control signal applied to the Q_Gain port to change the value of the degeneration resistance between a first value R5 and a second value R5 in parallel with R15+R16, and to change the value of the degeneration resistance between a first value R6 and a second value R6 in parallel with R17+R18. These resistor values can be selected to achieve desired gain states. For example, with OOK modulation, the gain can be reduced to near zero in the low gain state by making the values of R3-R6 very large, or by omitting them, which is desirable for OOK. Generally, by using multiple resistors and MOS transistors for each transconductor, several gain states can be achieved to support a variety of amplitude modulation indices, as is readily understood by one of ordinary skill in the art. Moreover, the exemplary modulation system of FIG. 13 can include slew rate control to reduce spectral splatter by including R-C low-pass filters in the gate inputs to transistors M9~M12 in FIG. 13, using techniques as discussed in the exemplary embodiment of FIG. 8 (which illustrates R-C low-pass filters in the gate inputs to transistors M1~M4).

The quadrature modulation circuit (1010') can be configured for simultaneous ASK/FSK or ASK/PSK modulation modes using methods described above with reference to FIG. 12. The MOS transistors M9/M10 in the I-channel and MOS transistors M11/M12 in the Q-channel can be controlled to modulate the amplitude of the I and Q channel input signals as needed to achieve a desired ASK modulation. For example, as noted above, for simultaneous ASK and FSK modulation, gain states of 1 and 0.5 (relative to full gain) could be used, representing an AM modulation index of 1 and 0.5.

It is to be understood that the multi-mode modulation systems described above are merely exemplary embodiments of the invention based on IQ modulation systems with Gilbert cell IQ mixer topologies, and that one of ordinary skill in the art could readily envision the application and implementation of inventive concepts and principles of the present invention to other types of modulation system and circuit architectures. For instance, modulation systems according to the invention may be implemented using mixer architectures other than Gilbert-cell mixers, such as diode-based mixers with integrated sign/amplitude modulation control circuitry. Moreover, integrated mixer/sign modulation circuits can be implemented using other types of transistors (instead of BJTs) and other polarity switching control mechanisms. Moreover, the invention is not limited to IQ modulation systems, but can be applied to single-channel modulation systems.

Figure 14:
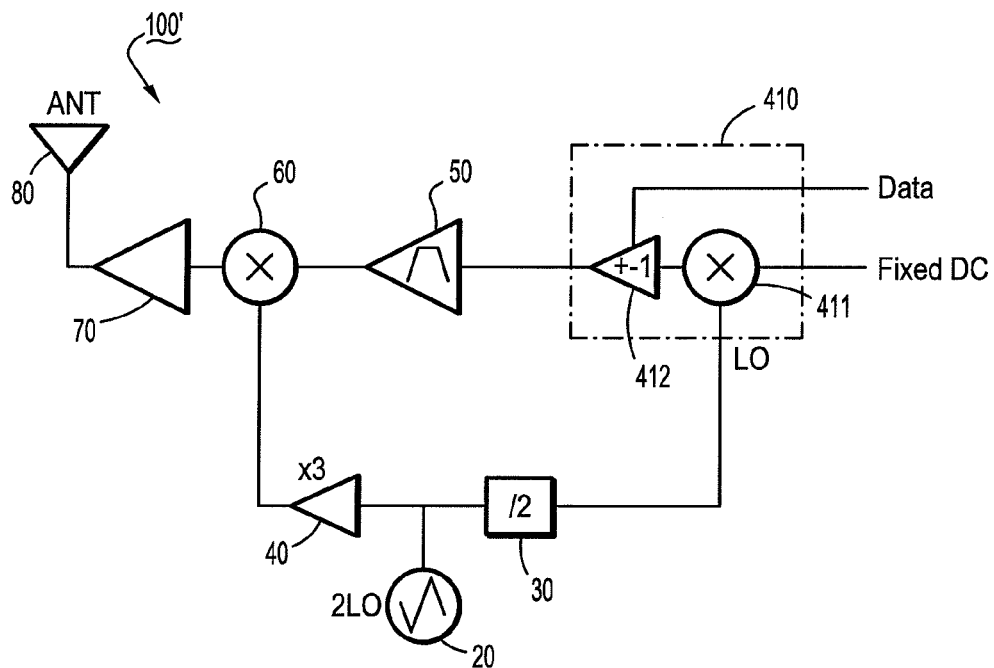
FIG. 14 is a schematic block diagram of an integrated radio transmitter which implements a single mixer modulation system according to an exemplary embodiment of the invention.

For example, FIG. 14 is a schematic block diagram of a radio communications system which implements a modulation system according to another exemplary embodiment of the invention. In particular, FIG. 14 schematically illustrates an integrated radio transmitter (100') having a single-channel modulator (410) having an integrated mixer and sign modulation control circuit topology to support PSK modulation at gigabit data rates, according to an exemplary embodiment of the invention. The single-channel modulator (410) comprises a single mixer (411) and an integrated sign modulation circuit (412) providing polarity switching control at the output of the mixer (411). The integrated radio transmitter (100') has a framework that is similar to the integrated radio transmitter (100) discussed above with reference to FIG. 2, for example, but slightly modified to support the single mixer embodiment, e.g., the frequency divider (30) divides a 2×LO frequency signal output from the LO generator (20) to generate a single LO signal input to the LO port of the mixer (411).

The single-channel modulation circuit (410) supports broadband PSK modulation of a carrier signal (LO signal) using a digital data stream (that is to be modulated onto the carrier) as a sign modulation control signal. For example, in one embodiment, the single mixer embodiment with sign control supports BPSK modulation by applying a DC voltage input to the baseband input port of the mixer (411) (DC level setting), applying an LO signal to the LO port of the mixer (411) and by applying a sign modulation control signal to the output of the mixer (411), where the sign modulation control signal can be the digital data signal that is to be encoded onto the LO carrier signal and transmitted.

It is to be appreciated that exemplary multi-mode modulation systems and circuits according to the invention are designed to support a plurality of modulation modes including FSK, PSK, ASK, QAM and simultaneous ASK/FSK and ASK/PSK modulation modes for high-data rate modulation applications. For instance, modulation techniques according to the invention can readily support gigabit-rate directional wireless data links in the 60 GHz ISM band, the 70 and 80 GHz licensed E-bands and other millimeter-wave applications. Indeed, modulation circuits and methods according to exemplary embodiments of the invention utilize high-speed interpolating sign modulation control architectures to realize FSK modulation at gigabit data rates, while simultaneously maintaining a smooth output waveform by use of interpolating switching mechanisms. Exemplary sign modulation circuits are integrated with mixers in a manner that enables the mixers to generate either upper or lower sidebands, and switch between the upper/lower sidebands in an approximately phase-continuous manner to achieve frequency modulation. These exemplary modulation frameworks obviate the need for tunable VCOs to realize high-rate FM, as in conventional designs. Moreover, exemplary embodiments of the invention readily support PSK modulation at gigabit data rates by using DC level control for level setting and a digital data signal, thereby eliminating the need for an external high speed digital modulator with amplitude control as in conventional modulation systems.

Although exemplary embodiments of the invention have been described herein with reference to the accompanying drawings, it is to be understood that the invention is not limited to those embodiments, and that various other changes and modifications may be effected therein by one skilled in the art without departing from the scope or spirit of the inven-

We claim:

1. A quadrature modulation circuit, comprising:
   a mixer circuit including an in-phase (I) mixer and a quadrature-phase (Q) mixer; and
   a summing circuit coupled to an output of the mixer circuit;
   wherein the I mixer comprises:
      a plurality of I mixer ports including a baseband input port, an output port, an LO (local oscillator) port and an I sign control port; and
      an integrated I sign modulation control circuit to control polarity switching of a signal at one of the I mixer ports in response to an I sign modulation control signal input to the I sign control port;
   wherein the Q mixer comprises:
      a plurality of Q mixer ports including a baseband input port, an output port, an LO (local oscillator) port and a Q sign control port; and
      an integrated Q sign modulation control circuit to control polarity switching of a signal at one of the Q mixer ports in response to a Q sign modulation control signal input to the Q sign control port; and
   wherein the summing circuit generates a modulated signal by adding signals output from the I and Q mixers,
   wherein the I mixer comprises an integrated I channel amplitude modulation control circuit to modulate an amplitude of an I-channel signal in response to an I gain control signal applied to an I gain control port of the I mixer, and wherein the Q mixer comprises an integrated Q-channel amplitude modulation control circuit to modulate an amplitude of a Q-channel signal in response to a Q gain control signal applied to a Q gain control port of the Q mixer,
   wherein the quadrature modulation circuit supports FSK (frequency-shift key), PSK (phase-shift key) and ASK (amplitude-shift key) modulation modes and simultaneous ASK/FSK and ASK/PSK modulation modes,
   wherein the quadrature modulation circuit performs ASK modulation by applying quadrature LO signals to the LO ports of the I and Q mixers, applying fixed-level DC signals to the baseband input ports of the I and Q mixers, applying fixed-level DC signals to the I and Q sign modulation control ports of the I and Q mixers, and applying a single digital data signal to both the I and Q gain control ports of the I and Q mixers to modulate the amplitude of I-channel and Q-channel signals, to thereby generate an ASK modulated signal the represents binary data of the digital data signal.

2. The circuit of claim 1, wherein the quadrature modulation circuit performs PSK modulation by phase modulating an LO signal using a digital data signal applied to at least one of the I or Q sign modulation control ports to control polarity switching, to thereby generate a PSK modulated signal that represents binary data of the digital data signal.

3. The circuit of claim 1, wherein the quadrature modulation circuit performs FSK modulation by frequency modulating a complex baseband input signal using a digital data signal applied to at least one of the I or Q sign modulation control ports to control polarity switching, to thereby generate a FSK modulated signal that represents binary data of the digital data signal.

4. The circuit of claim 1, wherein the quadrature modulation circuit performs MSK (minimum shift key) modulation by inputting quadrature LO signals to the LO ports of the I and Q mixers, inputting fixed-frequency sinusoidal quadrature signals to the baseband input ports of the I and Q mixers, inputting a first digital data signal as an I sign modulation control signal to control polarity switching at one of the I mixer ports, and inputting a second digital data signal as a Q sign modulation control signal to control polarity switching at one of the Q mixer ports, to thereby generate a frequency modulated signal that represents binary data of the first and second digital data signals.

5. The circuit of claim 1, wherein the quadrature modulation circuit performs BPSK (binary phase-shift key) modulation by inputting quadrature LO signals to the LO ports of the I and Q mixers, inputting fixed-level DC signals to the baseband input ports of the I and Q mixers, inputting one of the I and Q sign modulation control signals as a fixed-level DC signal and inputting the other one of the I and Q sign modulation control signals as a digital data signal to control polarity switching at one of the I mixer ports or Q mixer ports, to thereby generate a phase modulated signal that represents binary data of the digital data signal.

6. The circuit of claim 1, wherein the quadrature modulation circuit performs QPSK (quadrature phase-shift key) modulation by inputting quadrature LO signals to the LO ports of the I and Q mixers, inputting fixed-level DC signals to the baseband input ports of the I and Q mixers, inputting a first digital data signal as an I sign modulation control signal to control polarity switching at one of the I mixer ports, and inputting a second digital data signal as a Q sign modulation control signal to control polarity switching at one of the Q mixer ports, to thereby generate a phase modulated signal that represents binary data of the first and second digital data signals.

7. The circuit of claim 1, wherein the mixer circuit is a double balanced active mixer and wherein the I and Q mixers each comprise a mixing stage and transconductor stage.

8. The circuit of claim 7, wherein the integrated I and Q sign modulation control circuits are formed as part of the transconductor stages of respective I and Q mixers.

9. The circuit of claim 7, wherein the integrated I and Q sign modulation control circuits are formed as part of the mixing stages of respective I and Q mixers.

10. The circuit of claim 1, wherein the I and Q mixers each comprise a slew rate control circuit to control a slew rate of polarity switching by the I sign and Q sign modulation control circuits, respectively.

11. The circuit of claim 10, wherein the slew rate control circuits are configured to adjust the slew rate of polarity switching by the I and Q sign modulation circuits in response to a slew rate control signal applied to a slew rate control port of the mixer circuit.

12. The circuit of claim 1, wherein the ASK modulation is OOK (on-off keying) modulation where the I and Q integrated amplitude modulation control circuits control respective I and Q channel signal amplitude by switching between gain states of 0 and 1 relative to full gain.

13. The circuit of claim 1, wherein the ASK modulation is BASK (binary amplitude-shift key modulation) where the I and Q integrated amplitude modulation control circuits control respective I and Q-channel signal amplitude by switching between two different gain levels, where one or both of the gain levels are fixed or programmable.

14. The circuit of claim 1, wherein quadrature modulation circuit performs ASK modulation simultaneously with FSK modulation by inputting quadrature LO signals to the LO ports of the I and Q mixers, inputting fixed-frequency sinusoidal quadrature IQ signals to the baseband input ports of the I and Q mixers, applying a first digital data signal to both the I and Q gain control ports of the I and Q mixers to modulate the amplitude of I-channel and Q-channel signals by switching between, two different gain levels and by applying a second digital data signal to at least one of the I or Q sign control ports to control polarity switching of an I or Q-channel signal.

15. The circuit of claim 1, wherein quadrature modulation circuit performs ASK modulation simultaneously with PSK modulation by inputting quadrature LO signals to the LO ports of the I and Q mixers, inputting fixed-level DC signals to the baseband input ports of the I and Q mixers, applying a first digital data signal to the I gain control port of the I mixer to modulate the amplitude of an I-channel signal by switching between two different gain levels, applying a second digital data signal to the Q gain control port of the Q mixer to modulate the amplitude of a Q-channel signal by switching between two different gain levels, and by applying a third digital data signal to at least one of the I or Q sign control ports to control polarity switching of the I or Q-channel signal.

16. The circuit of claim 1, wherein the mixer circuit is a double balanced active mixer, wherein the I and Q mixers each comprise a mixing stage and transconductor stage, wherein the integrated I and Q amplitude modulation control circuits are formed as part of the transconductor stages of the I and Q mixers, respectively.

17. The circuit of claim 3, wherein the digital data signal is synchronized with a fixed-frequency sinusoidal signal applied to a baseband input port of the I or Q mixer such that polarity switching is performed synchronously at zero crossings of the fixed-frequency sinusoidal signal to realize a phase-continuous frequency switch.

18. A quadrature modulation circuit, comprising:
  a mixer circuit including an in-phase (I) mixer and a quadrature-phase (Q) mixer; and
  a summing circuit coupled to an output of the mixer circuit;
  wherein the I mixer comprises:
    a plurality of I mixer ports including a baseband input port, an output port, an LO (local oscillator) port and an I sign control port; and
    an integrated I sign modulation control circuit to control polarity switching of a signal at one of the I mixer ports in response to an I sign modulation control signal input to the I sign control port;
  wherein the Q mixer comprises:
    a plurality of Q mixer ports including a baseband input port, an output port, an LO (local oscillator) port and a Q sign control port; and
    an integrated Q sign modulation control circuit to control polarity switching of a signal at one of the Q mixer ports in response to a Q sign modulation control signal input to the Q sign control port; and
  wherein the summing circuit generates a modulated signal by adding signals output from the I and Q mixers,
  wherein the quadrature modulation circuit performs BFSK (binary frequency-shift key) modulation by inputting quadrature LO signals to the LO ports of the I and Q mixers, inputting fixed-frequency sinusoidal quadrature IQ signals to the baseband input ports of the I and Q mixers, inputting one of the I and Q sign modulation control signals as a fixed-level DC signal and inputting the other one of the I and Q sign modulation control signals as a digital data signal to control polarity switching at one of the I mixer ports or Q mixer ports, to thereby generate a frequency modulated signal that represents binary data of the digital data signal.

* * * * *

UNITED STATES PATENT AND TRADEMARK OFFICE
CERTIFICATE OF CORRECTION

PATENT NO. : 7,733,980 B2  Page 1 of 1
APPLICATION NO. : 11/486539
DATED : June 8, 2010
INVENTOR(S) : Beukema et al.

It is certified that error appears in the above-identified patent and that said Letters Patent is hereby corrected as shown below:

In the Specifications:

DELETE Column 1, Lines 8-11 as follows:

"This invention was made with Government support under Contract No. NBCH2030001 awarded by the Defense Advanced Research Projects Agency. The Government has certain rights in this invention."

INSERT at Column 1, Lines 8-11 as follows:

--This invention was made with Government support under Contract Numbers N66001-05-C-8013 and N6601-02-C-8014 awarded by the Defense Advanced Research Projects Agency. The Government has certain rights in this invention.--

Signed and Sealed this
Fourteenth Day of May, 2013

Teresa Stanek Rea
*Acting Director of the United States Patent and Trademark Office*